US012647590B2

(12) United States Patent
Nguyen et al.

(10) Patent No.: US 12,647,590 B2
(45) Date of Patent: *Jun. 2, 2026

(54) INTER-COMPONENT PREDICTION

(71) Applicant: DOLBY VIDEO COMPRESSION, LLC, Wilmington, DE (US)

(72) Inventors: Tung Nguyen, Berlin (DE); Ali Atef Ibrahim Khairat Abdelhamid, Berlin (DE); Detlev Marpe, Berlin (DE)

(73) Assignee: Dolby Video Compression, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/909,348

(22) Filed: Oct. 8, 2024

(65) Prior Publication Data

US 2025/0106422 A1 Mar. 27, 2025

Related U.S. Application Data

(63) Continuation of application No. 18/169,248, filed on Feb. 15, 2023, now Pat. No. 12,155,850, which is a
(Continued)

(51) Int. Cl.
H04N 19/11 (2014.01)
H04N 19/119 (2014.01)
(Continued)

(52) U.S. Cl.
CPC ........... H04N 19/44 (2014.11); H04N 19/119 (2014.11); H04N 19/176 (2014.11);
(Continued)

(58) Field of Classification Search
CPC .... H04N 19/44; H04N 19/119; H04N 19/176; H04N 19/186; H04N 19/50;
(Continued)

(56) References Cited

U.S. PATENT DOCUMENTS 6,556,624 B1 4/2003 Orchard
9,661,340 B2 * 5/2017 Sullivan ................. H04N 19/46
(Continued)

FOREIGN PATENT DOCUMENTS

BE 1007211 A5 4/1995
CN 1574970 A 2/2005
(Continued)

OTHER PUBLICATIONS

Office Action issued in corresponding Chinese Patent Application 2021105051071 dated Oct. 25, 2023.
(Continued)

*Primary Examiner* — Howard D Brown, Jr.
(74) *Attorney, Agent, or Firm* — Fish & Richardson P.C.

(57) ABSTRACT

Reconstructing a second component signal relating to a second component of a multi-component picture from a spatially corresponding portion of a reconstructed first component signal and a correction signal derived from data stream for the second component promises increased coding efficiency over a broader range of multi-component picture content. By including the spatially corresponding portion of the reconstructed first component signal into the reconstruction of the second component signal, any remaining inter-component redundancies/correlations present such as still present despite a possibly a priori performed component space transformation, or present because of having been introduced by such a priori performed component space information, for example, may readily be removed by way of the inter-component redundancy/correlation reduction of the second component signal.

20 Claims, 12 Drawing Sheets

Related U.S. Application Data continuation of application No. 16/988,271, filed on Aug. 7, 2020, now Pat. No. 11,595,674, which is a continuation of application No. 16/256,064, filed on Jan. 24, 2019, now Pat. No. 10,743,013, which is a continuation of application No. 14/875,743, filed on Oct. 6, 2015, now Pat. No. 10,237,567, which is a continuation of application No. PCT/EP2014/057090, filed on Apr. 8, 2014.

(60) Provisional application No. 61/846,450, filed on Jul. 15, 2013, provisional application No. 61/809,608, filed on Apr. 8, 2013.

(51) Int. Cl.

| | |
|---|---|
| *H04N 19/176* | (2014.01) |
| *H04N 19/186* | (2014.01) |
| *H04N 19/44* | (2014.01) |
| *H04N 19/50* | (2014.01) |
| *H04N 19/503* | (2014.01) |
| *H04N 19/593* | (2014.01) |
| *H04N 19/597* | (2014.01) |
| *H04N 19/82* | (2014.01) |
| *H04N 19/96* | (2014.01) |

(52) U.S. Cl.
CPC ........... *H04N 19/186* (2014.11); *H04N 19/50* (2014.11); *H04N 19/503* (2014.11); *H04N 19/593* (2014.11); *H04N 19/597* (2014.11); *H04N 19/82* (2014.11); *H04N 19/96* (2014.11)

(58) Field of Classification Search
CPC .. H04N 19/503; H04N 19/593; H04N 19/597; H04N 19/82; H04N 19/96; H04N 19/513; H04N 19/103; H04N 19/13; H04N 19/132; H04N 19/60; H04N 19/70
See application file for complete search history.

(56) References Cited

U.S. PATENT DOCUMENTS

| | | | | |
|---|---|---|---|---|
| 9,781,447 | B1 * | 10/2017 | Bultje | H04N 19/593 |
| 9,979,960 | B2 * | 5/2018 | Zhu | H04N 21/234363 |
| 11,595,674 | B2 * | 2/2023 | Nguyen | H04N 19/593 |
| 12,155,850 | B2 * | 11/2024 | Nguyen | H04N 19/503 |
| 2005/0013363 | A1 | 1/2005 | Cho et al. | |
| 2005/0063471 | A1 | 3/2005 | Regunathan et al. | |
| 2006/0233251 | A1 | 10/2006 | Kim et al. | |
| 2008/0008238 | A1 | 1/2008 | Song | |
| 2008/0019597 | A1 | 1/2008 | Song | |
| 2009/0041120 | A1 | 2/2009 | Yu | |
| 2010/0020866 | A1 | 1/2010 | Marpe et al. | |
| 2010/0158110 | A1 | 6/2010 | Pandit | |
| 2011/0142358 | A1 | 6/2011 | Katou et al. | |
| 2012/0195367 | A1 | 8/2012 | Kossentini et al. | |
| 2012/0229602 | A1 | 9/2012 | Chen et al. | |
| 2012/0250769 | A1 | 10/2012 | Bross et al. | |
| 2012/0307897 | A1 | 12/2012 | Yang et al. | |
| 2012/0307898 | A1 | 12/2012 | Chono et al. | |
| 2013/0051467 | A1 | 2/2013 | Zhou et al. | |
| 2013/0113884 | A1 * | 5/2013 | Leontaris | H04N 19/48 348/43 |
| 2013/0121415 | A1 * | 5/2013 | Wahadaniah | H04N 19/61 375/240.12 |
| 2015/0063438 | A1 * | 3/2015 | Kim | H04N 19/176 375/240.02 |
| 2015/0078447 | A1 * | 3/2015 | Gamei | H04N 19/80 375/240.12 |
| 2016/0029035 | A1 * | 1/2016 | Nguyen | H04N 19/186 |
| 2016/0227210 | A1 * | 8/2016 | Nguyen | H04N 19/105 |

FOREIGN PATENT DOCUMENTS

| | | |
|---|---|---|
| CN | 101160970 A | 4/2008 |
| CN | 101411196 A | 4/2009 |
| CN | 101416521 A | 4/2009 |
| CN | 101616329 A | 12/2009 |
| CN | 101828405 A | 9/2010 |
| CN | 102726043 A | 10/2012 |
| CN | 102939756 A | 2/2013 |
| CN | 113259681 A | 8/2021 |
| CN | 113259683 A | 8/2021 |
| CN | 113259684 A | 8/2021 |
| EP | 2 237 558 A1 | 10/2010 |
| EP | 2 725 794 A2 | 4/2014 |
| JP | 2009-278495 A | 11/2009 |
| JP | 2011-124846 A | 6/2011 |
| JP | 2012-129650 A | 7/2012 |
| JP | 2012-213175 A | 11/2012 |
| JP | 2013-021557 A | 1/2013 |
| KR | 10-2011-0063860 A | 6/2011 |
| KR | 10-2013-0006690 A | 1/2013 |
| WO | 2005/098756 A1 | 10/2005 |
| WO | 2011/054879 A2 | 5/2011 |
| WO | 2011/127963 A1 | 10/2011 |
| WO | 2011/127964 A2 | 10/2011 |
| WO | 2011/128269 A1 | 10/2011 |
| WO | 2013002589 A2 | 1/2013 |

OTHER PUBLICATIONS

Francois Pasteau et al., Adaptive color decorrelation for predictive image codecs. 2011 19th European Signal Processing Conference, Sep. 2, 2011.

Office Action issued in corresponding Chinese Patent Application 2021105047837 dated Oct. 26, 2023.

Office Action issued in corresponding Japanese Patent Application 2021-165187 dated Oct. 17, 2023.

Office Action issued in corresponding Chinese Patent Application 2021105048401 dated Nov. 20, 2023.

Office Action issued in corresponding Chinese Patent Application 2021105052657 dated Nov. 9, 2023.

Kei Kawamura et al., "AHG7: Inter-place intra coding for residual signals", Joint Collaborative Team on Video Coding (JCT-VC) of ITU-T SG16 WP3 and ISO/IEC JTC1/SC29/WG11 JCTVC-K0191_r2, ITU-T, Oct. 10-19, 2012, p. 1-4.

Kei Kawamura et al., "Inter-channel prediction coding in CTB structure", Study Report of the Institute of Electronics, Information and Communication Engineers, The Institute of Electronics, Information and Communication Engineers, Jul. 18, 2011, vol. 11, No. 156, p. 49-54.

Kei Kawamura et al., "Inter-channel prediction coding of intra-prediction residual signal in CTB structure", Collected papers of Lectures at General meeting 2011 of the Institute of Electronics, Information and Communication Engineers Information System 2, The Institute of Electronics, Information and Communication Engineers, Feb. 28, 2011, p. S-8.

Detlev Marpe et al., "CE5: Color transform issues and related results", Joint Video Team (VT) of ISO/IEC MPEG & ITU-T VCEG (ISO/IEC JTC1/SC29/WG11 and ITU-T SG16 Q.6) JVT-S073, ITU-T, Apr. 7, 2006, p. 1-6.

Nguyen et al., "RCE1/RCE2/AHG5/AHG8: Adaptive Inter-Plane Prediction for RGB Content", Joint Collaborative Team on Video Coding (JCT-VC) of ITU-T SG 16 WP 3 and ISO/IEC JTC 1/SC 29/WG 11, JCTVC-M0230, Apr. 18-26, 2013, pp. 1-7.

Pasteau et al., "Adaptive Color Decorrelation for Predictive Image Codecs", European Signal Processing Conference, EUSIPCO, Jan. 1, 2011, 5 pages.

Merkle et al., "Efficient Prediction Structures for Multiview Video Coding", IEEE Transactions on Circuits and Systems for Video Technology, vol. 17, No. 11, Nov. 2007, pp. 1461-1473.

Schwarz et al., "3D Video Coding Using Advanced Prediction, Depth Modeling, and Encoder Control Methods", 2012 Picture Coding Symposium, May 9, 2012, pp. 1-4.

(56) References Cited

OTHER PUBLICATIONS

Pu, Wei et al., Non RCE1: Inter Color Component Residual Prediction, Joint Collaborative Team on Video Coding (JCT-VC) of ITU-T SG16 WP3 and ISO/IEC JTC1/SC29/WG11, 14th Meeting: Vienna, AT, Jul. 25-Aug. 2, 2013, [JCTVC-N0266], Jul. 30, 2013, JCTVC-N0266 (version 7), pp. 1-7.

Kawamura Kei et al., Estimate of Inter-channel Prediction Coding of Intra-Prediction Residual Signal in CTB Structure, FIT 2011 10th Forum on Information Technology, Japan, Information Processing Society of Japan The Institute of Electronics. Information and Communication Engineers, Aug. 22, 2011, pp. 1-4.

Kawamura, Kei et al., AHG7: Inter-plane intra coding for residual signals, Joint Collaborative Team on Video Coding (JCT-VC) of ITU-T SG16 WP3 and ISO/IEC JTC1/SC29/WG11, 11th Meeting: Shanghai, CN, Oct. 10-19, 2012, [JCTVC-K0191_r2], Jan. 12, 2013, JCTVC-K0191 (version 3), pp. 1-4.

Kawamura, Kei et al., Non-RCE1: Inter colour-component residual coefficients prediction, Joint Collaborative Team on Video Coding (JCT-VC) of ITU-T SG16 WP3 and ISO/IEC JTC1/SC29/WG11, 15th Meeting: Geneva, CH, Oct. 23-Nov. 1, 2013, [JCTVC-O0263], Oct. 24, 2013, JCTVC-O0263 (version 2), pp. 1-5.

* cited by examiner

INTER-COMPONENT PREDICTION

CROSS-REFERENCE TO RELATED APPLICATIONS

This present application is a continuation of U.S. patent application Ser. No. 18/169,248, filed Feb. 15, 2023, which is a continuation of U.S. patent application Ser. No. 16/988, 271, filed Aug. 7, 2020, now U.S. Pat. No. 11,595,674, which is a continuation of U.S. patent application Ser. No. 16/256,064, filed Jan. 24, 2019, now U.S. Pat. No. 10,743, 013, which is a continuation of U.S. patent application Ser. No. 14/875,743, filed Oct. 6, 2015, now U.S. Pat. No. 10,237,567, which is a continuation of International Application PCT/EP2014/057090, filed Apr. 8, 2014, and additionally claims priority from U.S. Patent Applications 61/809,608, filed Apr. 8, 2013 and U.S. provisional Application 61/846,450, filed Jul. 15, 2013, and European Application EP 14150373.0, filed Jan. 7, 2014, all of which are incorporated herein by reference in their entireties.

BACKGROUND OF THE INVENTION

The present application is concerned with inter-component prediction in multi-component picture coding such as between luma and chroma.

In image and video signal processing, color information is mainly represented in a color space typically consisting of three components like R'G'B' or Y'CbCr. The first component, Y' in the case of Y'CbCr, is often referred to as the luma and the remaining two components, the Cb and the Cr components or planes in the case of Y'CbCr, are referred to as the chroma. The advantage of the Y'CbCr color space over the R'G'B' color space is mainly the residual characteristic of the chroma components, i.e., the chroma components contain less energy or amplitude comparing to the chroma signals of absolute color spaces like R'G'B'. In particular for Y'CbCr, the luma component implies the grey scale information of the image or video and the chroma component Cb implies the difference relative to the blue primary, respectively Cr denotes the difference relative to the red primary.

In the application space of image and video compression and processing, Y'CbCr signals are advantageous as compared to R'G'B' due to the fact that the color space transformation from R'G'B' to Y'CbCr reduces or removes the correlation between the different color components or planes. In addition to the correlation removal, less information has to be transmitted, and hence, the color transformation acts as a compression approach too. Such a preprocessing in correlation removal or reduction enables higher compression efficiency while maintaining or increasing the complexity in a meaningful amount as an example. A hybrid video compression scheme is often designed for Y'CbCr input because the correlation between the different color components is removed or reduced and the designs of hybrid compression schemes only have to consider the separate processing of the different components. However, the transformation from R'G'B' to Y'CbCr and vice versa is not lossless, and hence, information, i.e., sample values available in the original color space might be lost after such a color transformation. This issue can be avoided by using color spaces involving a lossless transformation from the original color space and back to the original color space, e.g., the Y'CoCg color space when having R'G'B' input. Nevertheless, fixed color space transformations might lead to sub-optimal results depending on the application. For image and video compression, fixed color transformations are often sub-optimal for higher bit rates and non-natural signals with high or without correlation between the color planes. In the second case, a fixed transformation would introduce correlation between the different signals, and in the first case, the fixed transformation might not remove all the correlation between the different signals. Furthermore, due to the global application of the transformation, correlation might not be completely removed from the different components or planes locally or even globally. Another issue introduced by a color space transformation lies in the architecture of an image or video encoder. Usually, the optimization process tries to reduce a cost function, which is often a distance metric defined over the input color space. In the case of transformed input signals, it can be difficult to achieve an optimal result for the original input signal due to additional processing steps. Consequently, the optimization process might result in a minimum cost for the transformed signal but not for the original input signal. Although the transformations are often linear, the cost calculation in the optimization process often involves a signaling overhead and the cost for the final decision is then calculated by a Lagrangian formula. The latter might lead to different cost values and different optimization decision. The color transformation aspect is especially crucial in the domain of color representation as modern image and video displays usually use the R'G'B' color composition for content representation. Generally speaking, transformations are applied when correlation within the signal or between the signals should be removed or reduced. As a consequence, the color space transformation is a special case of the more generic transformation approach.

Accordingly, it would be favorable to have a multi-component picture coding concept at hand which is even more efficient, i.e. achieves higher bitrates over a broader range of multi-component picture content.

SUMMARY

One embodiment has a decoder configured to decode a multi-component picture spatially sampling a scene with respect to different components, by reconstructing a first component signal relating to a first component of the multi-component picture from a data stream; reconstructing a portion of a second component signal relating to a second component of the multi-component picture from a spatially corresponding portion of the reconstructed first component signal and a correction signal derived from the data stream, wherein the first and second components are color components and the first component signal is a prediction residual of a temporally, spatially or inter-view prediction of the first component of the multi-component picture and the second component signal is a prediction residual of a temporal, spatial or inter-view prediction of the second component of the multi-component picture.

Another embodiment has an encoder configured to encode a multi-component picture spatially sampling a scene with respect to different components, by encoding a portion of a second component signal relating to a second component of the multi-component picture by prediction from a spatially corresponding portion of a reconstructed first component signal and inserting a correction signal for correcting the prediction into the data stream.

According to another embodiment, a method for decoding a multi-component picture spatially sampling a scene with respect to different components may have the steps of: reconstructing a first component signal relating to a first component of the multi-component picture from a data stream; and reconstructing a portion of a second component signal relating to a second component of the multi-component picture from a spatially corresponding portion of the reconstructed first component signal and a correction signal derived from the data stream, wherein the first and second components are color components and the first component signal is a prediction residual of a temporally, spatially or inter-view prediction of the first component of the multi-component picture and the second component signal is a prediction residual of a temporal, spatial or inter-view prediction of the second component of the multi-component picture.

According to another embodiment, a method for encoding a multi-component picture spatially sampling a scene with respect to different components may have the steps of: encoding a portion of a second component signal relating to a second component of the multi-component picture by inter-component prediction on the basis of a spatially corresponding portion of a reconstructed first component signal and inserting a correction signal for correcting the inter-component prediction into the data stream, wherein the first and second components are color components and the first component signal is a prediction residual of a temporally, spatially or inter-view prediction of the first component of the multi-component picture and the second component signal is a prediction residual of a temporal, spatial or inter-view prediction of the second component of the multi-component picture.

The present invention is based on the finding that reconstructing a second component signal relating to a second component of a multi-component picture from a spatially corresponding portion of a reconstructed first component signal and a correction signal derived from a data stream for the second component promises increased coding efficiency over a broader range of multi-component picture content. By including the spatially corresponding portion of the reconstructed first component signal into the reconstruction of the second component signal, any remaining inter-component redundancies/correlations present such as still present despite a possibly a priori performed component space transformation, or present because of having been introduced by such a priori performed component space transformation, for example, may readily be removed by way of the inter-component redundancy/correlation reduction of the second component signal.

In accordance with an embodiment of the present application, the multi-component picture codec is construed as a block-based hybrid video codec operating in units of code blocks, prediction blocks, residual blocks and transform blocks, and the inter-component dependency is switched on and off at a granularity of the residual blocks and/or transform blocks by a respective signaling in the data stream. The additional overhead for spending the signaling is overcompensated by the coding efficiency gain as the amount of inter-component redundancy may vary within a picture. In accordance with an embodiment of the present application, the first component signal is a prediction residual of a temporally, spatially or inter-view prediction of the first component of the multi-component picture and the second component signal is a prediction residual of a temporal, spatial or inter-view prediction of the second component of the multi-component picture. By this measure, the inter-component dependency exploited focuses on remaining inter-component redundancies so that the inter-component prediction may tend to show a smoother spatial behavior.

In accordance with an embodiment, a first weight at which the spatially corresponding portion of the reconstructed first component signal influences the reconstruction of the second component signal, denoted in the following, is adaptively set a sub-picture granularity. By this measure, the intra-picture variation in inter-component redundancy may be more closely followed. In accordance with an embodiment, a mixture of a high-level syntax element structure and sub-picture granularity first-weight syntax elements is used in order to signal the first weight at the sub-picture granularity, wherein the high-level syntax element structure defines a mapping from a domain set of possible bin strings of a predetermined binarization of the first-weight syntax elements onto a co-domain of possible values of the first weight. By this measure, the overhead for a side information for controlling the first weight is kept low. The adaptation may be done forward adaptively. A syntax element may be used per block such as residual or transform block, which has a limited number of signalable states which symmetrically index one of a number of weight values for symmetrically distributed around zero. In one embodiment, the number of signalable states is uneven with the number of weight values including zero, wherein the signaling of zero is used so as to signal the non-use of inter-component prediction so that an extra flag becomes obsolete. Further, the magnitude is signaled before the conditionally signaled sign, with the magnitude is mapped onto the number of weight values and if the magnitude is zero, the sign is not signaled so that signalization costs are further reduced.

In accordance with an embodiment, a second weight at which the correction signal influences the reconstruction of the second component signal, is set at a sub-picture granularity, either in addition to, or alternatively to, the adaptive setting of the first weight. By this measure, the adaptivity of inter-component redundancy reduction may further be increased. In other words, in accordance with an embodiment, in reconstructing the second component signal, weights of a weighted sum of the correction signal and the spatially corresponding portion of the reconstructed first component signal, may be set at a sub-picture granularity. The weighted sum may be used as a scalar argument of a scalar function which is, at least per picture, constant. The weights may be set in a backward-driven manner based on a local neighbourhood. The weights may be corrected in a forward-driven manner.

In accordance with an embodiment, the domain where the reconstruction of the second component signal from a spatially corresponding portion of the reconstructed first component signal using the correction signal is performed, is the spatial domain. Alternatively, the spectral domain is used. And even alternatively, the domain used is changed between spatial and spectral domain. The switching is performed at sub-picture granularity. It turned out that the ability to switch, at sub-picture granularity, the domain where the combination of the reconstructed first component signal and the correction signal takes place, increases the coding efficiency. The performing the switching may be done in backward-adaptive manner or in a forward-adaptive manner.

In accordance with an embodiment, a syntax element in the data stream is used to enable changing the role of the first and second component signals within the components of the multi-component picture. The additional overhead for signaling the syntax element is low compared to the possible gain in coding efficiency.

In accordance with an embodiment, the reconstruction of the second component signal is allowed to switch, at sub-picture granularity, between the reconstruction based on the reconstructive first component signal only, and reconstructing same based on the reconstructed first component signal and a further reconstructed component signal of a further component of the multi-component picture. At relatively low additional effort, this possibility increases the flexibility in removing residual redundancies between components of the multi-component picture.

Likewise, in accordance with an embodiment, a first syntax element in the data stream is used in order to, globally or at an increased scope level, enable or disable the reconstruction of the second component signal based on the reconstructed first component signal. If enabled, sub-picture level syntax elements in the data stream are used to adapt the reconstruction of the second component signal based on a reconstructed first component signal at a sub-picture granularity. By this measure, spending side information for the sub-picture level syntax elements may merely be employed in application cases or multi-component picture contents for which the enablement results in a coding efficiency gain.

Alternatively, the switching between enablement and disablement is performed locally in a backward-driven manner. In this case, the first syntax element does not even need to be present in the data stream. In accordance with an embodiment, for example, the local switching is performed locally depending on a check whether first and second component signals are prediction residuals of a spatial prediction with the intra-prediction mode of the spatial prediction coinciding, or not deviating by more than a predetermined amount. By this measure, the local switching between enablement and disablement does not consume bitrate.

In accordance with an embodiment, a second syntax element in the data stream is used so as to switch between adaptive reconstruction of the second component signal based on the reconstructed first component signal at sub-picture granularity forward-adaptively using sub-picture level syntax elements in the data stream, and non-adaptively performing the reconstruction of the second component signal based on the reconstructed first component signal. The signaling overhead for the second syntax element is low compared to the possibility of avoiding the overhead for transmitting the sub-picture level syntax elements for multi-component picture content for which non-adaptively performing the reconstruction is already efficient enough.

In accordance with an embodiment, the concept of inter-component redundancy reduction is transferred onto a three chroma component picture. In accordance with an embodiment, luma and two chroma components are used. The luma component may be chosen as the first component.

In accordance with an embodiment, the sub-picture level syntax element for adapting the reconstruction of the second component signal from the reconstructed first component signal is coded within the data stream using a Golomb-Rice code. The bins of the Golomb-Rice code may be subject to binary arithmetic coding. Different contexts may be used for different bin positions of the Golomb-Rice code.

In accordance with an embodiment, the reconstruction of the second component signal from the reconstructed first component signal involves a spatial re-scaling and/or a bit depth precision mapping on the spatially corresponding portion of the reconstructed first component signal. The adaptation of the spatially rescaling and/or performance of the bit depth precision mapping, may be done in a backward and/or forward adaptive manner. The adaptation of the spatial re-scaling may involve the selection of a spatial filter. The adaptation of the performance of the bit depth precision mapping may involve the selection of a mapping function.

In accordance with an embodiment, the reconstruction of the second component signal from the reconstructed first component signal is done indirectly via a spatially low-pass filtered version of the reconstructed first component signal.

Advantageous implementations of embodiments of the present application are the subject of the dependent claims.

BRIEF DESCRIPTION OF THE DRAWINGS

Embodiments of the present invention will be detailed subsequently referring to the appended drawings, in which.

DETAILED DESCRIPTION OF THE INVENTION

The description brought forward below starts with the description of a detailed embodiment of an encoder and a description of a detailed embodiment of a decoder fitting to the encoder, wherein after generalized embodiments are presented.

Figure 1:
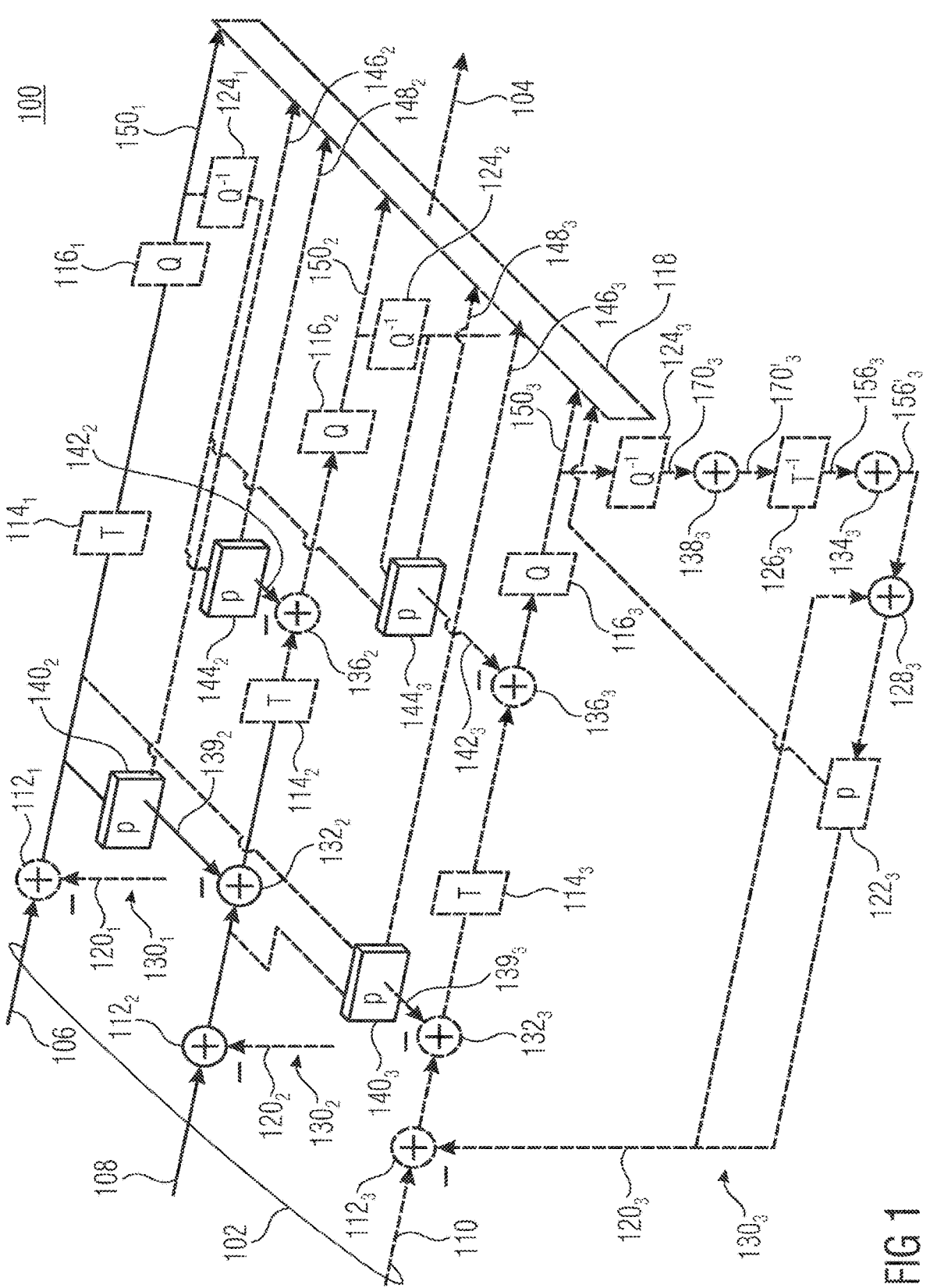
FIG. 1 shows a block diagram of an encoder configured to encode a multi-component picture in accordance with an embodiment.

FIG. 1 shows an encoder 100 configured to encode a multi-component picture 02 into a data stream 104. FIG. 1 illustrates exemplarily the case of the multi-component picture 102 comprising three components 106, 108 and 110, but the description brought forward below will reveal that advantageous embodiments of the present application may be easily derived from the description of FIG. 1 by transferring the present three-component picture example onto an example where merely two components, such as components 106 and 108, are present. Accordingly some of the elements of encoder 100 shown in FIG. 1 are shown using dashed lines and are insofar optional features with respect to more generalized embodiments as set out further below.

In principle, the encoder of FIG. 1 and all of the embodiments described hereinafter could operate with any type of "component". In effect, the multi-component picture 102 is a picture of a scene which samples the scene with respect to the various components 106, 108 and 110 spatially at otherwise coinciding conditions with respect to, for example, time stamp, view conditions and the like. In order to ease the understanding of the embodiments further described below, however, it is assumed that the components 106, 108 and 110 all relate to the texture and are, for example, color components such as luma and chroma components, or color components of any other color space.

The encoder of FIG. 1 is substantially configured to apply block-based hybrid video coding to each of components 106, 108 and 110 of picture 102 separately with, however, using inter-component prediction so as to reduce inter-component redundancies. Inter-component prediction relates to various aspects as will be outlined in more detail below.

Accordingly, the encoder 100 comprises, per component 106, 108 and 110, a sequence of a prediction residual former 112, here exemplarily embodied as a subtractor, a transformer 114 and a quantizer 116 serially connected, in the order of their mentioning between an input at which a respective component 106, 108 and 110, respectively arrives, and a respective input of a data stream former 118 configured to multiplex the quantized coefficients and other coding parameters mentioned in more detail below, into the data stream 104. While a non-inverting input of prediction residual former 112 is arranged so as to receive the respective component of picture 102, the inverting (subtrahend) input thereof receives a prediction signal 120 from a predictor 122, the input of which is connected to the output of quantizer 116 via a reconstruction path comprising a sequence of a dequantizer 124, a re-transformer 126 and a prediction/residual combiner 128, here exemplarily embodied as an adder. While the output of prediction/residual recombiner 126 is connected to an input of prediction 122, and a first input is connected to an output of re-transformer 126, a further input thereof receives the prediction signal 120 output by predictor 122.

Elements 112, 114, 116, 124, 126, 128, 122 and 120 are present within encoder 100 in a parallel manner for each of components 106 to 110 so as to form three separate block-based hybrid video coding paths 1301, 1302 and 1303. The indices 1, 2 and 3 are used to distinguish between the different components of picture 102 with index 1 associated with component 106, index 2 associated with component 108 and index 3 associated with component 110.

In the example shown in FIG. 1, component 106 represents a kind of "base component" as will become clearer from the description brought forward below. It should be noted, however, and will be discussed also in more detail below, that the role among components 106 to 110 may be equalized in that a configuration illustrated and shown in FIG. 1 has been chosen merely for the sake of an easier understanding of the principles of the embodiments of the present application described in more detail below. In any case, in order to distinguish the elements 112, 114, 116, 124, 126, 128, 122 and 120 of paths 1301 to 1303 described so far, the indices are also used with respect to these elements.

As became clear from the note presented above, in the example of FIG. 1 components 108 and 110 represent "dependent components" and for this reason, further elements in addition to those already discussed for coding paths 1301 to 1303 are connected between these already discussed elements. In particular, a spatial domain inter-component prediction residual former 132 is connected, by means of its non-inverting input and its output, between prediction residual former 112 on the one hand and the input of transformer 114 on the other hand, and likewise, a spatial-domain inter-component prediction and residual recombiner 134 is connected between retransformer 126 on the one hand and prediction/residual recombiner 128 on the other hand. FIG. 1 also shows a spectral domain inter-component prediction residual former 136 as being positioned, by way of its non-inverting input and its output, between transformer 114 and quantizer 116 with a corresponding spectral domain inter-component prediction/residual recombiner 138 being connected between dequantizer 124 on the one hand and retransformer 126 on the other hand. The pair of spatial-domain inter-component prediction former 132 and corresponding recombiner 134 is fed, at its further input, by a respective spatial domain inter-component residual predictor 140, and likewise, the further input of spectral domain inter-view prediction former 136 along with its associated recombiner 138 is fed with a spectral domain residual prediction signal 142 provided by a spectral domain inter-component residual predictor 144. At its input interface, predictors 140 and 144 are connected with internal nodes of any of the respective preceding coding paths. For example, predictor $140_2$ is connected to the output of prediction residual former 1121, and predictor $144_2$ has an input connected to the output of dequantizer 1241. Likewise, predictors $140_3$ and $144_3$ have an input connected to the output of prediction residual former 1122 and dequantizer 1242, respectively, but additionally a further input of predictor $140_3$ is shown as being connected to the output of prediction residual former 1121 and a further input of predictor $144_3$ is shown as being connected to the output of dequantizer 1241. Predictors 140 and 144 are shown as optionally generating prediction parameters for implementing a forward adaptive control of the inter-component prediction performed by the same, with the parameters output by predictors 140 being indicated by 146, and the parameters output by predictor 144 being indicated by reference sign 148. Just as residual signal 150 output by quantizers 116 does, the prediction parameters 146 and 148 of predictors 140 and 144 are received by data stream former 118 which, for example, in a lossless manner codes all of this data into data stream 104.

Figure 2:
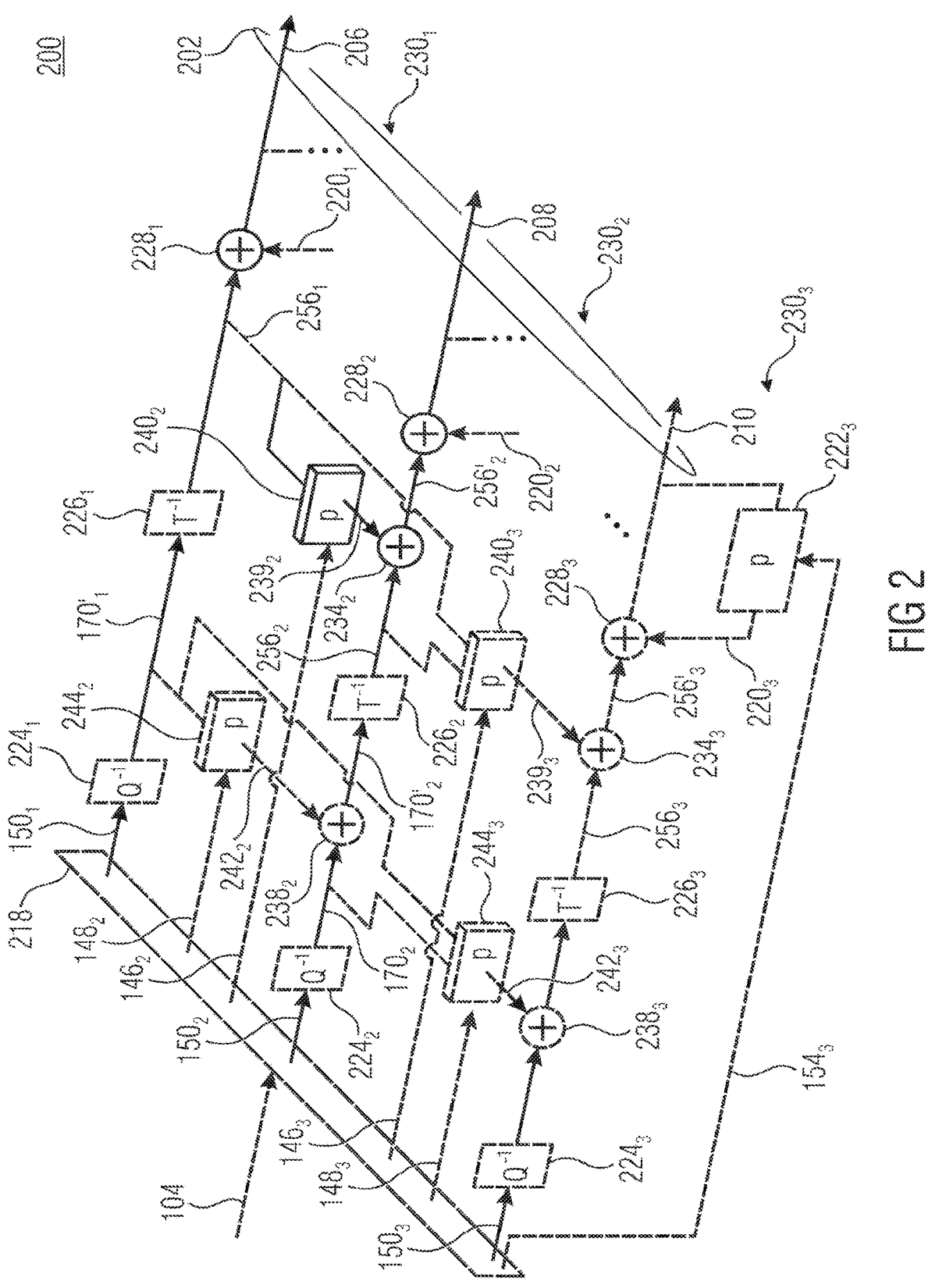
FIG. 2 shows a block diagram of a decoder fitting to the encoder of FIG. 1 in accordance with an embodiment.

Before describing the mode of operation of the encoder of FIG. 1 in more detail below, reference is made to FIG. 2 which shows the corresponding decoder. Substantially, the decoder 200 corresponds to that part of encoder 100 which, for each component, extends from dequantizer 124 to predictor 122 and accordingly, the same reference signs, but increased by 100, are used with respect to these corresponding elements. To be more precise, the decoder 200 of FIG. 2 is configured to receive the data stream 104 at the input of a data stream extractor 218 of decoder 200, configured to extract from the data stream 104 the residual signals $150_1$ to $150_3$ and all related coding parameters including predication parameters 146 and 148. Corresponding to the encoder 100 of FIG. 1, the decoder 200 of FIG. 2 is structured into parallel decoding paths 230, with one path per component of the multi-component picture, the reconstruction of which is indicated using reference sign 202 and the reconstructed component of which are output at the output of the respective decoding path as 206, 208 and 210. Due to quantizations, the reconstruction deviates from the original picture 102.

As already denoted above, the decoder paths $230_1$ to $230_3$ of decoder 200 substantially correspond to those paths of coding paths $130_1$ to $130_3$ of encoder 100, encompassing elements 124, 138, 126, 134, 128 and 122 thereof. That is, the decoding paths $230_2$ and $230_3$ of the "dependent components" 208 and 210 comprise between a respective output of data stream extractor 218 on the one hand and the respective output for outputting the respective component 208 and 210, respectively, a serial connection of a dequantizer 224, a spectral domain inter-component prediction/residual recombiner 238, an inverse transformer 226, a spatial domain inter-component prediction/residual recombiner 234 and prediction/residual recombiner 228 connected between data stream extractor 218 on the one hand and the output of decoder 200 for outputting multi-component picture 202, on the other hand, in the order of their mentioning, wherein a predictor 222 is connected into a feedback loop leading from the prediction/residual recombiner 228 back to another input thereof. The further inputs of 238 and 234 are fed by the respective spatial domain and spectral domain inter-component predictors 240 and 244. The decoding path $230_1$ of the "base component" 206 differs in that elements 238, 234, 244 and 240 are not present. Predictor $244_3$ has an input thereof connected to an output of dequantizer $224_2$, and another output connected to the output of dequantizer $224_1$, predictor $240_3$ has a first input connected to an output of inverse transformer $226_2$ and another input connected to an output of inverse transformer $226_1$. Predictor $244_2$ has an input connected to the output of dequantizer $224_1$, and predictor $240_2$ has an input thereof connected to inverted transformer $226_1$.

It should be noted that predictors $140_3$ and $140_2$ of FIG. 1 have been shown as being connected to the not-yet quantized residual signals of underlying components in the spatial domain merely for the sake of an easier illustration, but that, as becomes clear from FIG. 2, in order to avoid prediction inconsistencies between encoder and decoder, predictors $140_2$ and $140_3$ of FIG. 1 may alternatively and advantageously be connected to the outputs of inverse transformers $126_2$ and $126_1$, respectively, instead of the non-quantized versions of the spectral domain residual signals of the underlying components.

After having described the structure of both encoder 100 and decoder 200, their mode of operation is described hereinafter. In particular, as already described above, encoder 100 and decoder 200 are configured to use hybrid coding so as to encode/decode each component of the multi-component picture. Actually, each component of the multi-component picture 102 represents a sample array or picture, each spatially sampling the same scene with respect to a different color component. The spatial resolution of components 106, 108 and 110, i.e. the spectral resolution at which the scene is sampled with respect to the respective component, may differ from component to component.

Figure 3:
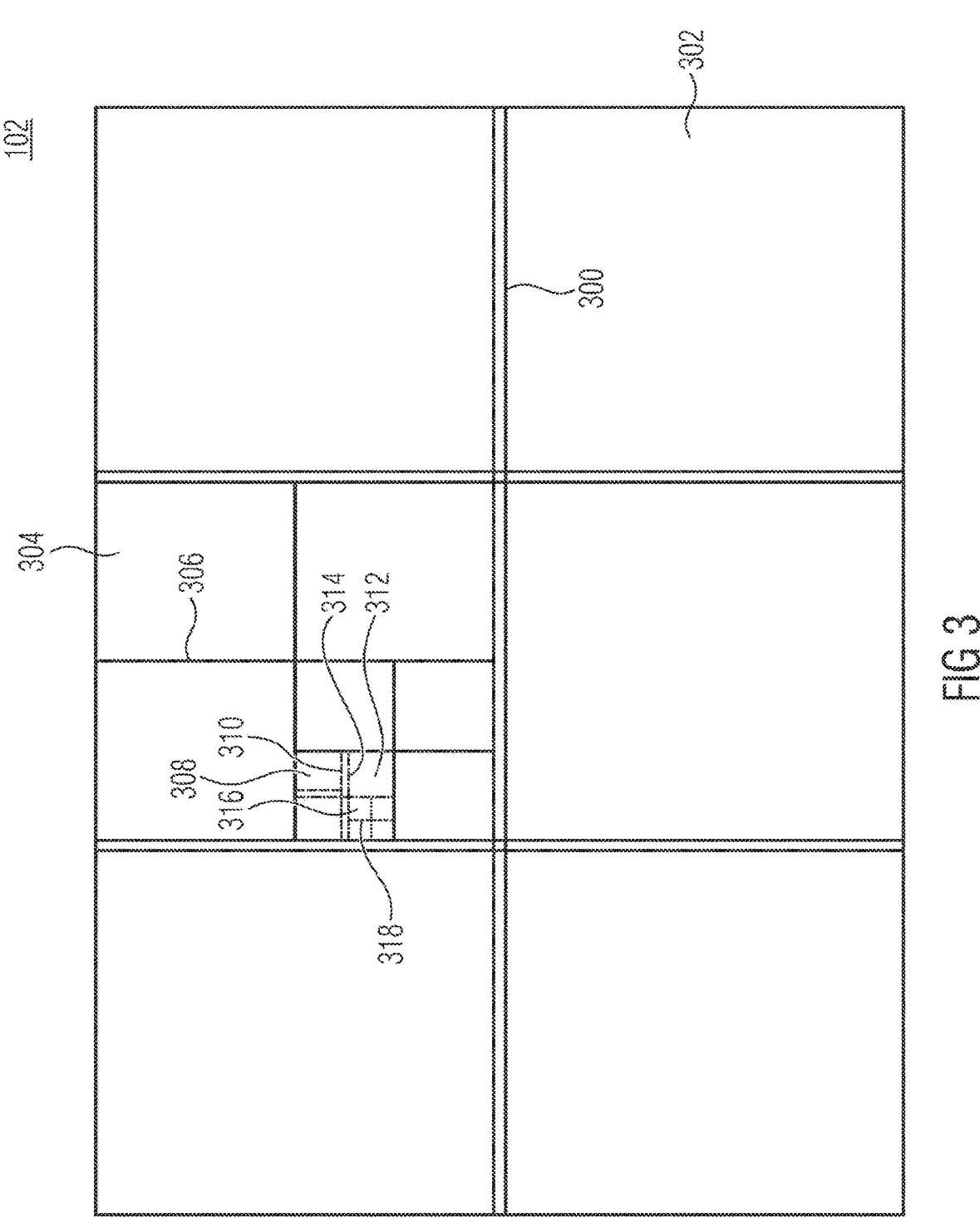
FIG. 3 schematically shows a picture and its subdivision/partitioning into various blocks of different type in accordance with an embodiment.

As described above, the components of the multi-component picture 102 are separately subject to hybrid encoding/decoding. "Separately" does not necessarily mean that the encoding/decoding of the components is performed completely independent of each other. First of all, inter-component prediction removes redundancies between the components and additionally some coding parameters may be chosen commonly for the components. In FIG. 3, for example, it is assumed that the predictors 122 and 222 choose the same subdivision of picture 102 into coding blocks, but a component individual subdivision of picture 102 into coding blocks by predictors 122 and 222 is feasible as well. The subdivision of picture 102 into coding blocks may be fixed or may be signaled within the data stream 104. In the latter case, subdivision information may be part of prediction parameters output by predictor 122 to data stream former 118 and indicated using reference sign 154, wherein data stream extractor 218 extracts these prediction parameters including the subdivision information and outputs same to predictor 222.

FIG. 3 illustrates exemplarily that the subdivision of picture 102 into coding blocks or code blocks may be done in accordance with a two stage process, according to which the multi-component picture 102 is first regularly subdivided into tree root blocks, the outlines of which are indicated using doubled lines 300 in FIG. 3, with subsequently applying recursive multi-tree subdivisioning in order to subdivide each tree root block 302 into code blocks 304, the outlines 306 of which are illustrated in FIG. 3 using simple continuous lines 306. Thus, code blocks 304 represent leaf blocks of the recursive multi-tree subdivisioning of each tree root block 302. The aforementioned subdivision information possibly contained within data stream 104—either for the components commonly or for the components individually—may comprise multi-tree subdivision information for each tree root block 302 for signaling the respective tree root block's 302 subdivision into the code blocks 304 and optionally subdivision information controlling and signaling picture's 102 subdivision into the regular arrangement of tree root blocks 302 in rows and columns.

In units of code blocks 304, for example, predictors 122 and 222 vary between a plurality of prediction modes supported by encoder 100 and decoder 200, respectively. For example, predictors $122_1$ to $122_3$ select the prediction modes for the code blocks individually and indicate the selection via prediction parameters $154_1$ to $154_3$ to predictors $222_3$. The available prediction modes may comprise temporal and spatial prediction modes. Other prediction modes may be supported as well, such as inter-view prediction modes or the like. Using recursive multi-tree subdivisioning, such as dual-tree subdivisioning, code blocks may be further subdivided into prediction blocks 308, the outlines 310 of which are indicated in FIG. 3 using dashed lines. Respective recursive subdivision information may be contained in the prediction parameters $154_1$ to $154_3$ for each code block. In an alternative embodiment, this selection of the prediction modes is performed at the granularity of the prediction blocks. Likewise, each code block 304 may, using recursive multi-tree subdivisioning, such as dual tree subdivisioning, further be subdivided into residual blocks 312, the outlines of which are indicated using dash-dot-lines 314 in FIG. 3. Thus, each code block 304 is, concurrently, partitioned into prediction blocks 308 and residual blocks 312. The residual blocks 312 may, optionally, be further subdivided into transform blocks 316, the outlines of which are indicated using dash-dot-dot lines 318 in FIG. 3. Alternatively, transform and residual blocks form the same entities, i.e. residual blocks are transform blocks and vice versa. In other words, the residual blocks may coincide with the transform blocks in accordance with an alternative embodiment. Residual block and/or transform block related subdivision information may or may not be contained within the prediction parameters 154.

Depending on the prediction mode associated with the respective code block or prediction block, each prediction block 308 has respective prediction parameters associated therewith which are selected by predictors $122_1$ to $122_3$ appropriately, inserted into parameter information $154_1$ to $154_3$ and used by predictors $222_1$ to $222_3$ so as to control the prediction within the respective prediction blocks 308 accordingly. For example, prediction blocks 308 having a temporal prediction mode associated therewith may have a motion vector for motion-compensated prediction associated therewith, and optionally a reference picture index indicating a reference picture from which, with the displacement indicated by the motion vector, the prediction of the respective prediction block 308 is derived/copied. Prediction blocks 308 of a spatial prediction mode may have a spatial prediction direction associated therewith, contained within prediction information $151_1$ to $154_3$, the latter indicating the direction along which the already reconstructed surrounding of the respective prediction block is spatially extrapolated into the respective prediction block.

Thus, using the prediction modes and prediction parameters, predictors 122 and 222 derive a prediction signal $120_1$ to $120_3$ for each of the components, and for each of the components, this prediction signal is corrected using a residual signal $156_1$ to $156_3$. These residual signals are coded by use of transform coding. That is, transformers $114_1$ to $114_3$ perform a transformation, i.e. a spectral decomposition, onto each transform block 116 individually, such as a DCT, DST or the like, and the inverse transformers 226 reverse the same individually for the transform blocks 308, i.e. perform, for example, a IDCT or IDST. That is, as far as the encoder 100 is concerned, the transformers 114 perform the transformation onto the not yet quantized residual signal as formed by prediction residual formers 112. Inverse transformers 126 and 226 reverse the spectral decomposition on the basis of the quantized residual signal 150 of the respective component which is in a lossless manner, such as using Huffman or arithmetic coding, inserted into the data stream by data stream former 118 and extracted therefrom using, for example, Huffman or arithmetic decoding, by data stream extractor 218.

However, in order to lower the data rate for coding the residual signal $256_1$ to $256_3$ using which the prediction signal $220_1$ to $220_3$ is corrected at prediction/residual recombiner $228_1$ to $228_3$, encoders 100 and 200 support inter-component prediction with respect to the coding of the components' residual signal. As will be described in more detail below, in accordance with embodiments of the present application, the inter-component prediction for coding the residual signal may be switched on and off and/or forward and/or backwards adaptively adjusted at the granularity of residual blocks and/or transform blocks. If switched off, the inter-component prediction signals output by predictors 140, 144 and 240 and 244 are zero and the residual signals $256_1$ to $256_3$ of all components are derived from the quantized transform coefficients contained in its respective residual signal $150_1$ and $150_3$ solely. If switched on, however, inter-component redundancies/correlations are removed as far as the dependent components are concerned, i.e. residual signals $256_2$ and $256_3$ are coded/decoded using inter-component prediction. The base (first) component serving as inter-component prediction source is, as far as the inter-component prediction is concerned, left unchanged. How this is done is outlined in the following.

For the time being, the description of the inter-component redundancy reduction realized by predictors 140, 144, 240 and 244 focuses on the inter-component redundancy reduction between components 106 and 108 and 206 and 208, respectively. After that, in order to ease understanding, the description is extended to the three component case illustrated in FIGS. 1 and 2.

As will become clear from the description brought forward below, the embodiments outlined below take advantage of, for example, the residual characterization of the chroma components, especially in cases where absolute chroma components, or planes, serve as the input. In case of the three components of FIGS. 1 and 2, for example, representing components of a luma/chroma color space, component 106/206 may for example be a luma component, while components 108/208 and 110/210 are chroma components, such as blue- and red-related chroma components. By keeping the distortion calculation defined over the original input space, the embodiments outlined below enable higher fidelity. In other words, the encoder of FIG. 1 along with the decoder of FIG. 2 enable inputting an original multi-component picture as it is without, for example, any color space transformation being performed in advance. The coding efficiency achievable by the embodiments of FIGS. 1 and 2 is independent from the input color space, i.e. the embodiments outlined below for performing inter-component redundancy removal act as an additional correlation removal step for y'CbCr input 106 to 110, and as a color transform in case of R'G'B' input 106 to 110. Additionally, the embodiments further outlined below apply the redundancy reduction between the components, or planes, locally, i.e. the encoder 100 decides for each region of the image/picture 102, or the video, adaptively whether inter-plane/component prediction involving the residual signals, is applied or not. However, again it is noted that embodiments of the present invention are not restricted to color components or planes only, rather the techniques set out herein can be applied to generic planes/components as well where the resulting residuals of the two or more planes consists of correlation. For example, the embodiments described in the present application can be applied to planes from different layers in a scalable video compression scheme as well. On the top of the prediction, the processing order of the components or planes can be chanted locally, such as for example by way of a syntax element signaling the component order in the bit stream. This alternative is also described below.

With respect to FIGS. 1 and 2, a case of a hybrid block-based image and video compression scheme is illustrated, where the prediction performed by predictors 122/222 is performed log-based and transform coding to which transformers 114, quantizers 116, data stream inserter 118 as far as the encoding side is concerned, and inverse transformer 226 and dequantizer 224 as well as data stream extractor 218, as far as the decoding side is concerned, contribute is applied to the prediction error, i.e. the output of prediction residual formers 112, referred to as residual.

Please note that the term block shall be understood as describing a generic rectangular shape in the following, i.e. a block can have a rectangular shape.

In the embodiments described next, the encoder decides on the application of the inter-claim/component prediction for each prediction block 308 or transform block 304.

As an intermediate note, however, it is submitted herewith that embodiments of the present invention are not restricted to the case outlined with respect to FIGS. 1 and 2, where the inter-plane/component prediction is applied to the prediction residual of a spatially, temporally and/or inter-view prediction signal. Theoretically, the embodiments presented herein could likewise be transferred onto a case where the inter-plane/component prediction is performed on the sample of the components directly. In other words, when prediction itself is skipped, the original samples of the input signal should be referred to, or may be treated as, residual for the remaining description.

For each residual block 312 (or rectangular shape), in accordance with an embodiment, a syntax element is transmitted in the data stream 104, and the syntax element denotes whether or not the inter-plane/component prediction by way of predictors 140, 144, 240, 244 should be used. In the case of a video compression scheme like H.265/EVC, also illustrated in FIG. 3, where the residual is further divided into smaller transform blocks or shapes 216, the encoder 100 may, in accordance with an embodiment, transmit the just mentioned syntax element specifying the usage or non-usage of the inter-plane/component prediction for each transform block 316, or even a group of transform blocks. Note that the grouping, i.e. signaling level, could be adaptively selected and such a grouping decision may be transmitted as a further syntax element in the bit/data stream 104, such as in a header of the data stream. At the highest signaling level the usage, or the non-usage of the inter-plane/ component prediction might be signaled for a coding unit or coding block 304, a group of code blocks 304, or even for a whole image or frame.

Figure 4:
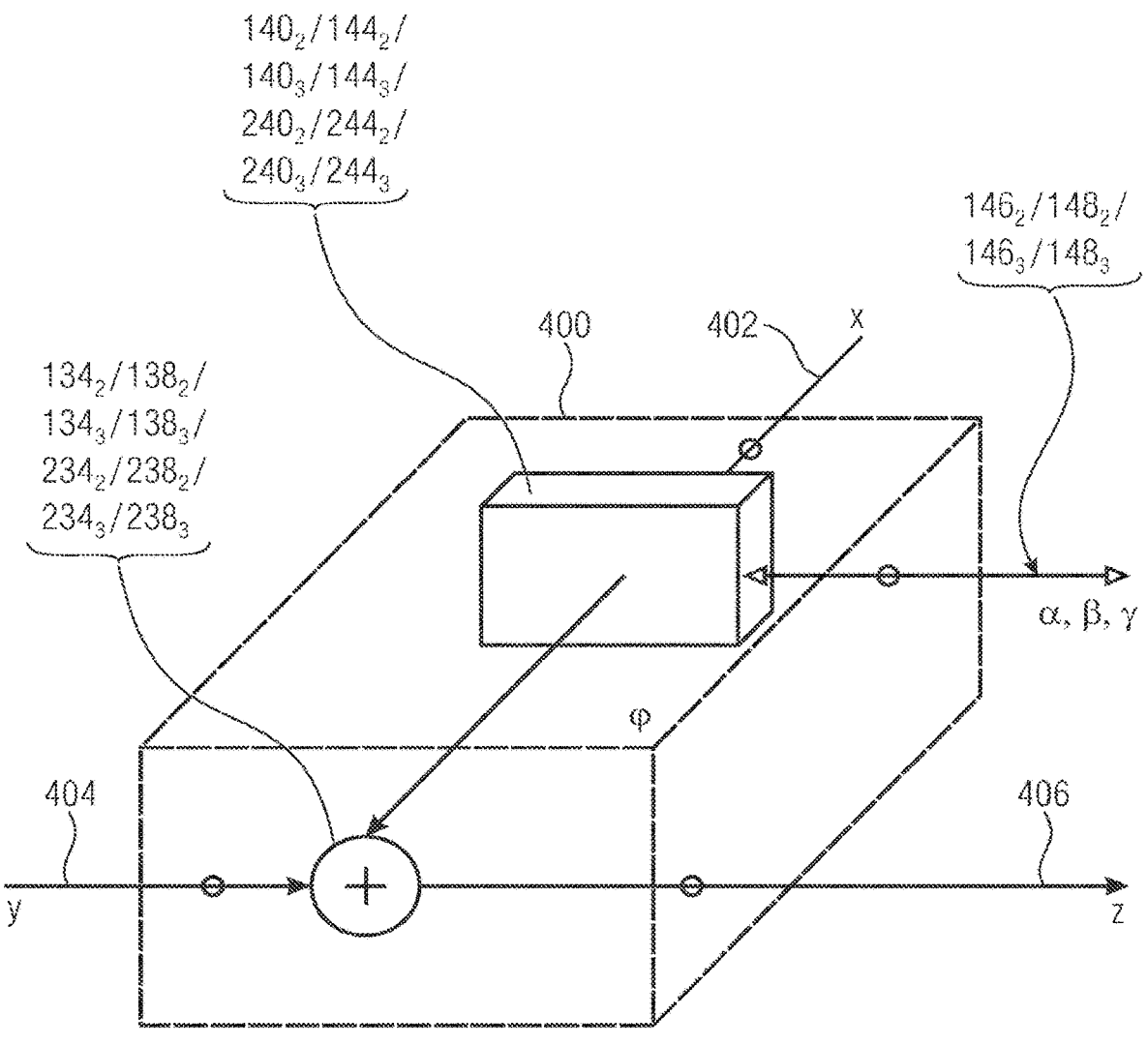
FIG. 4 schematically shows a reconstruction module in accordance with an embodiment of the present application and being built into encoders and decoders of FIGS. 1 and 2.

Differently speaking, reference is made to FIG. 4. FIG. 4 illustrates a reconstruction module 400 which is embodied in the embodiments shown in FIGS. 1 and 2 at several portions, namely per pair of spatial domain inter-component predictor 140₂ and associated spatial domain inter-component prediction/residual recombiner 134₂, receiving x in form of the data stream extracted, dequantized and inverse transformed residual signal 156₁, receiving y in form of the data stream extracted, dequantized and inverse transformed residual signal 156₂, and outputting z as residual signal 156'2 replacing residual signal 156₂, spectral domain inter-component predictor 144₂ and associated spectral domain inter-component prediction/residual recombiner 138₂, receiving x in form of the data stream extracted and dequantized residual signal 170₁, receiving y in form of the data stream extracted and dequantized residual signal 170₂, and outputting z as residual signal 170'₂ replacing residual signal 170₂, spatial domain inter-component predictor 140₃ and associated spatial domain inter-component prediction/residual recombiner 134₃, receiving x in form of the data stream extracted, dequantized and inverse transformed residual signal 156₁ or the data stream extracted, dequantized and inverse transformed residual signal 156₂ (or any combination thereof or both of them), receiving y in form of the data stream extracted, dequantized and inverse transformed residual signal 156₃, and outputting z as residual signal 156'₃ replacing residual signal 156₃.

spectral domain inter-component predictor 144₃ and associated spectral domain inter-component prediction/residual recombiner 138₃, receiving x in form of the data stream extracted and dequantized residual signal 170₁ or the data stream extracted and dequantized residual signal 170₂ (or any combination thereof or both of them), receiving y in form of the data stream extracted and dequantized residual signal 170₃, and outputting z as residual signal 170'₃ replacing residual signal 170₃, spatial domain inter-component predictor 240₂ and associated spatial domain inter-component prediction/residual recombiner 234₂, receiving x in form of the data stream extracted, dequantized and inverse transformed residual signal 256₁, receiving y in form of the data stream extracted, dequantized and inverse transformed residual signal 256₂, and outputting z as residual signal 256'₂ replacing residual signal 256₂, spectral domain inter-component predictor 244₂ and associated spectral domain inter-component prediction/residual recombiner 238₂, receiving x in form of the data stream extracted and dequantized residual signal 270₁, receiving y in form of the data stream extracted and dequantized residual signal 270₂, and outputting z as residual signal 170'₂ replacing residual signal 270₂, spatial domain inter-component predictor 240₃ and associated spatial domain inter-component prediction/residual recombiner 234₃, receiving x in form of the data stream extracted, dequantized and inverse transformed residual signal 256₁ or the data stream extracted, dequantized and inverse transformed residual signal 256₂ (or any combination thereof or both of them), receiving y in form of the data stream extracted, dequantized and inverse transformed residual signal 256₃, and outputting z as residual signal 256'₃ replacing residual signal 256₃, spectral domain inter-component predictor 244₃ and associated spectral domain inter-component prediction/residual recombiner 238₃, receiving x in form of the data stream extracted and dequantized residual signal 270₁ or the data stream extracted and dequantized residual signal 270₂ (or any combination thereof or both of them), receiving y in form of the data stream extracted and dequantized residual signal 270₃, and outputting z as residual signal 270'₃ replacing residual signal 270₃.

At all of these occasions at FIGS. 1 and 2, the subsequently described in more detail inter-plane/component prediction is performed and at any of these occasions, the embodiments of FIGS. 1 and 2 may be amended by way of the more generalized inter-plane/component prediction module 400 of FIG. 4. Note that merely some of the occasions may actually be used.

As is shown in FIG. 4, the inter-plane/component prediction module 400 or reconstruction module 400 has two inputs and one output and, optionally, uses a prediction parameter signaling between encoder and decoder side. The first input 402 is denoted as "x" and represents the inbound reconstructed first component signal on the basis of which the inter-plane/component redundancy reduction for the second component is performed by reconstruction module 400. This reconstructed first component signal 402 may be, as is shown in FIGS. 1 and 2, the transmitted residual signal as extracted from the data stream for the portion of the first component, co-located to the portion of the second component being currently the subject of inter-plane/component redundancy reduction, in spatial or spectral domain.

The other input signal 404 of reconstruction module 400 is denoted "y" and represents the transmitted residual signal of the portion of the second component, currently being the subject of inter-plane/component redundancy reduction by module 400, in the same domain as signal 402, i.e. spectral or spatial domain. The reconstruction module 400 reconstructs a second component signal 406, denoted "z" in FIG. 4 in, again, the same domain, which component signal 406 represents the main output of reconstruction module 400 and at least participates in reconstructing the dependent component of the multi-component picture by replacing x. "At least" means that, as shown in FIGS. 1 and 2, the component signal 406 output by reconstruction module 400 may represent a prediction residual, and accordingly still have to be combined with the prediction signal 154, of the respective dependent component i.

Just as the other modules of encoder and decoder, the reconstruction module 400 operates on a block-basis. The operation on a block-basis may, for example, manifest itself in a block-wise adaptation of the inter-component redundancy reduction reversal performed by reconstruction module 400. The "block wise adaptation" may involve, optionally, the explicit signaling of prediction parameters 146/148 within the data stream. A backward adaptive setting of the parameters for controlling the inter-component redundancy reduction is feasible, however, as well. That is, referring to FIG. 4, in case of the reconstruction module 400 being built into the decoder, the prediction parameters enter the restriction module, and thus represent a further input thereof, whereas in the case of reconstruction module 400 being built into the encoder, the prediction parameters are internally determined in a manner exemplified below involving, for example, the solving of an LSE optimization problem.

Figure 5:
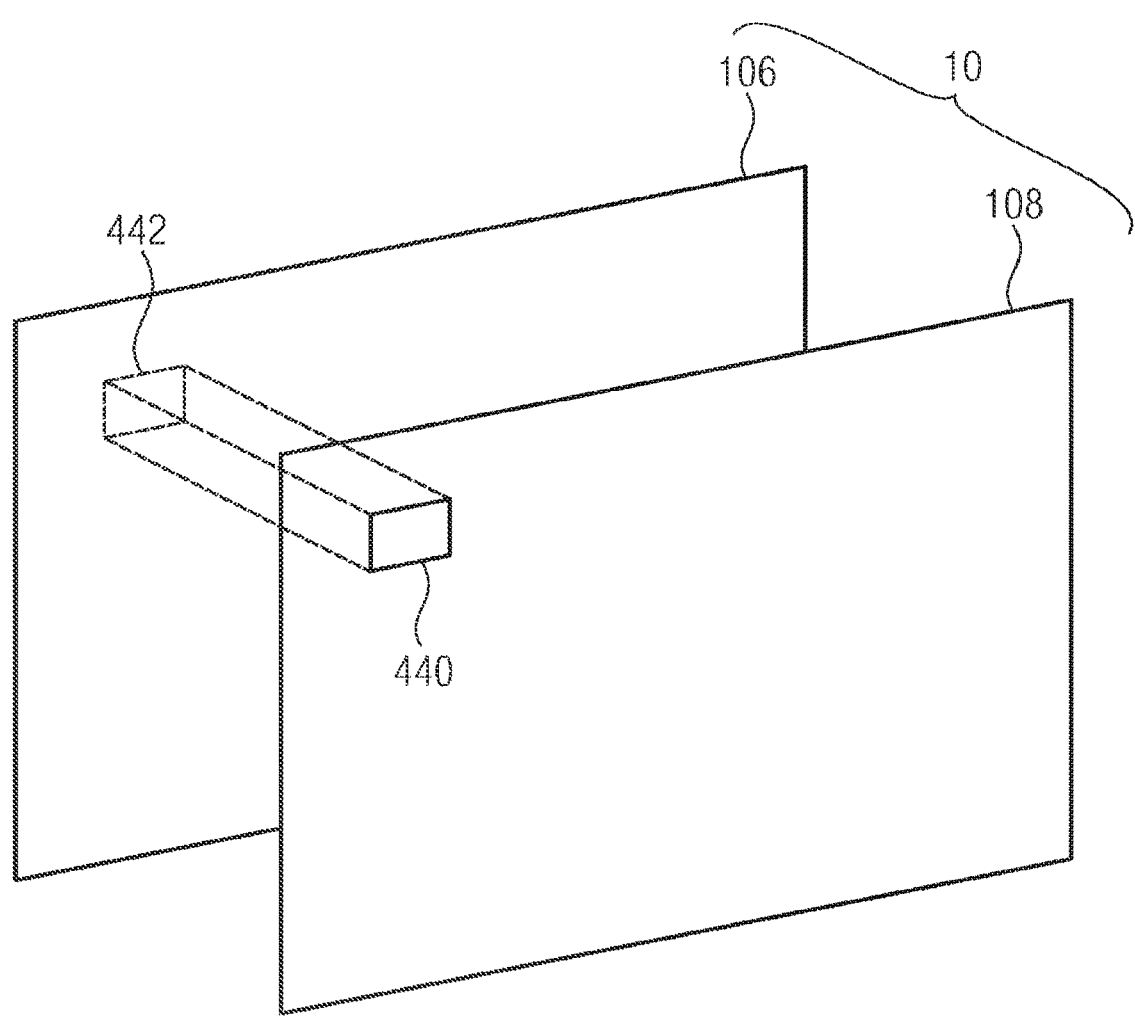
FIG. 5 schematically shows a picture with two components, a currently inter-component predicted block as well as the spatially corresponding portion within the first (base) component.

As outlined in more detail below, a reconstruction module 400 may, for example, operate in such a manner that z is representable as $\varphi(\alpha x+\beta+\gamma y)$, $\alpha$, $\beta$ and $\gamma$ are possible inter-component prediction parameters. For each of $\alpha$, $\beta$ and $\gamma$, it may hold true that same is a constant, thus is neither backward nor forward adaptively varied, is backward adaptively varied and accordingly does not form part of the data stream, or is forward adaptively varied and is signaled in the data stream. FIG. 5 illustrates this for the exemplary case of the inter-component prediction form first component 106 to second component 108. IN specifically outlined examples below, for example, the operation is alleviated in a manner so that $z=\alpha x+y$.

FIG. 5 shows a currently reconstructed portion or block 440 of the second component 108. FIG. 5 also shows the spatially corresponding portion/block 442 of the first component 106, i.e. the portion spatially co-located within the picture 10. The input signals 402 and 404 which module 400 receives for components 106 and 108 with respect to co-located blocks 440 and 442 may, as outlined with respect to FIGS. 1 and 2, represent residual signals as transmitted for components 106 and 108 within the data stream. With respect to the second component 108, module 400 computes z. For each block, such as block 440, the parameters $\alpha$, $\beta$ and $\gamma$—or merely a subset thereof—are adapted in a manner exemplified further below.

In particular, for a given block such as block 440, it may be signaled within the data stream by way of a syntax element, as to whether or not inter-component prediction is to be performed. The parameters $\alpha$, $\beta$ and $\gamma$ in case of inter-component prediction being switched on, merely represent possible examples. For a block 440 for which inter-component prediction is applied, a prediction mode may be signaled in the data stream, a prediction source may be signaled in the data, a prediction domain may be signaled in the data stream and parameters related to the aforementioned parameters may be signaled in the data stream. The meaning of "prediction mode", "prediction source", "prediction domain" and "related parameters" will become clear from the description brought forward below. In the examples described so far, the inter-component prediction operates on residual signals. That is, x and y were prediction residuals as transmitted within the data stream and both represent prediction residuals of a hybrid prediction. As also described above, x and y may be prediction residuals in the spatial domain or in the frequency domain in the exemplary case of using transform coding as outlined above. Applying the prediction in the stage of an encoder or a decoder has several benefits. First of all, additional memory is usually unnecessary, and second the inter-component prediction can be performed locally, i.e. without the introduction of additional intermediate steps after the parsing process from the decoder point of view. In order to distinguish the prediction domain, a further syntax element might be transmitted in the bit stream. That is, the latter further syntax element may indicate whether the inter-component prediction domain may be the spatial domain or the spectral domain. In the first case, x, y and z are in the spatial domain, and in the latter case x, y and z are in the spectral domain. Please note that from the decoder perspective, the residual is reconstructed from the bit stream and can be different from those that have been generated in the encoder before the quantization step. However, it is advantageous to use the already quantized and reconstructed residual as a prediction source in an encoder implementing the embodiment of the present application. Furthermore, in the case of skipping the transform stage, the inter-component prediction in the spatial and frequency domains is exactly the same. For such a configuration, the signaling of the prediction domain, i.e. spatial or frequency domain, can be skipped.

As far as the aforementioned "prediction modes" are concerned, same can be affine, linear, non-linear or more complex. In the first case, the predictor might be written as already described above, namely as $z=\varphi(\alpha x+\beta+\gamma y)$ where z is the reconstructed residual signal or sample, x is the vector containing samples from the prediction source signal, $\alpha$, $\beta$ and $\gamma$ are model parameters, and y samples from the current signal, i.e. the past residual signal from the decoder side, and $\varphi$ can be some linear or non-linear function.

To keep the processing chain as simple as possible, an example configuration might keep the processing of the first component, such as the luma component, unchanged and use the luma reconstructed residual signal as a predictor for the component residual signals. This is a possible prediction source configuration and note that such a simple prediction source simplifies the generic transformation approach, where all three components or planes of the input signal may be used in order to generate the transform samples.

Another possible configuration is to make the prediction source adaptive, i.e. signaling which residual signal of all already available, or respectively reconstructed residual components, are used for prediction. Alternatively, the processing order can be changed locally, e.g. the second component is reconstructed first and is used as prediction source for the remaining components. Such a configuration takes the advantage from the fact that the delta between two components using a bijective (or nearly invertible) predictor is the same, but with inverted sign, however, the absolute cost for coding the prediction source is different. Furthermore, the combination of several prediction sources is possible. In this case, the combination weights might be transmitted in the bit stream or estimated backward-driven using the statistics of the available or respective coded neighbors.

The specification of the model parameters can be performed backward-driven, composed of backward-drive estimation and forward signalization, or completely forward signalized in the data stream. An example configuration is to use a fixed set of model parameters, known both at the encoder and decoder, and signaling the set index to the decoder for each block or shape. Another configuration is to use a dynamic set or a list where the order of predictors is changed after a specific number of block or shapes. Such an approach enables higher local adaptation to the source signal. A more detail example on prediction mode, prediction source, prediction domain and parameter signaling is brought forward below.

As to the prediction mode, the following may be noted.

The prediction mode can be affine, non-linear, or a more complex function realized by approaches like splines or support vector regression.

Note that color space transformations are mostly linear employing all available input components. That is, color space transformations tend to map a three component vector of three color components, onto another vector of another three components of another color space. Encoder and decoder may, in accordance with an embodiment of the present application, operate independently from the input color space, and hence the luma component might be kept unchanged in order to form a prediction source. However, in accordance with an alternative embodiment, the definition of the "luma component" or "first component" can be different for each block, such as prediction or transformation block (or rectangular shape), i.e. for each block or shape, the component which serves as the "first component" might be selected adaptively. The adaptation may be indicated to the encoder by a signaling in the data stream. For example, while FIG. 5 illustrates the case of component 106 forming the "first component" while component 108 is the component inter-component predicted, i.e. the second component, as far as block 440 is concerned, things could be different for another block of picture 10 where, for example, component signal 106 is inter-component predicted from component 108. The block-wise adaptation of the "prediction source" may be indicated within the data stream as just-outlined. Additionally or alternatively, for each block 440, a syntax element signaling where the prediction is applied or not may be transmitted within the data stream. That is, in case of using component 106 as the "first component" constantly, such a syntax element would be present for blocks of a dependent component only, i.e. components 108 and 110 in FIGS. 1 and 2. In that case, the first component, such as the luma component, would provide the prediction source, namely the residual signal thereof in case of the above outlined embodiments.

If prediction is enabled for a certain block 440, additionally or alternatively the prediction mode may be signaled within the data stream for that block 440. Please note that the prediction might be skipped for the case of a zero-valued reconstructed first component signal, i.e. a zero-valued residual luma signal in case of using a prediction residual as a basis for the inter-component prediction. In that case, the aforementioned syntax element signaling whether or not the inter-component prediction is applied, could be omitted, i.e. not present, in the data stream for the respective block 440.

In the case of a combined backward-driven and forward signalization approach, parameters derived from already coded respective reconstructed data can serve as starting parameters. In such a case, a delta relative to the selected prediction mode can be transmitted in the data stream. This could be achieved by calculating the optimal parameter for a fixed or adapted prediction mode and the calculated parameters are transmitted in the bit stream. Another possibility is to transmit some delta relative to a starting parameter derived by using a backward-drive selection approach or using the parameters calculated and selected by the backward-driven approach only.

An example configuration of prediction modes is described in the following. In this example, the first prediction mode implies $\alpha=1$, $\beta=0$, $\gamma=1$ and $\varphi(x)=x$ and the second prediction mode implies the same parameters except for $\alpha=0.5$ with $x=(x_0)$, $y=(y_0)$ and the single elements of x and y are the residual value for the block at the same spatial position in the first and second components, such as in the luma component and the respective position at the chroma component. Differently speaking, in accordance with an embodiment of the present application, for each block 440, for which the inter-component prediction is applied, it is signaled in the data stream whether $\alpha$ equals a first value, namely 1, or a second value, here 0.5. Instead of a signaling in the data stream, a mixed backward and forward driven approach may be used as already described above, or the selection among the available values of $\alpha$ may be performed backward adaptively. $\beta$ and $\gamma$ would merely represent constants.

Note that the single element in y is replaced after the prediction by z. In other words, the reconstruction module 400 receives the correction signal 404 and replaces same by z406. Also note that when using such a configuration, the inter-component prediction is simplified to an addition operation: either the fully reconstructed residual sample value of the first component ($\alpha=1$) or half its value ($\alpha=0.5$) is added to a correction sample value 404. The halving may be generated by a simple right shift operation. In that case, for example, the configuration could be implemented by realizing the multiplication between x and $\alpha$ in the predictor within reconstruction module 400, and realizing the addition in the adder shown in FIG. 4. In other words, in the given example, at the encoder side the mode of operation would be as follows.

The residual signal of the chroma component for a transform block (or rectangular shape) is subtracted by the reconstructed residual sample at the same (spatial or frequency) location in the luma plane. After transform and quantization, the reconstructed residual is added to the reconstructed residual sample at the same spatial location in the luma plane. From the decoder perspective, only the latter operation may be used. An example configuration of an approach involving a backward-driven scheme can be done as follows. For each block or shape 440, an optimum parameter $\alpha$ is calculated. A starting $\alpha^0$ is derived backward-driven from the local neighborhood, e.g., from the above and the left block (or rectangular shape) that have been coded before. If a syntax element in the bit stream signals that no further parameters are transmitted in the bit stream, the derived $\alpha^0$ is used. Otherwise, i.e., prediction should be used but corrected by a syntax element denotes a delta $\alpha^0$ in the bit stream. It is also possible to transmit two flags, the first flag indicates whether $\alpha^0$ should be used and the second flag indicates whether an $\alpha^0$ exists in the bit stream.

Another possible configuration is to increase the granularity for the parameter derivation process. This approach also implies higher signalization granularity when forward transmission is applied. Otherwise, a higher granularity for the backward-driven scheme is implied. In this possible configuration, the prediction parameters are derived for each sample or for a group of samples within a transform block (or rectangular shape) or even for a prediction block itself. Please note that a special case is given by coupling the signaling level to transform blocks (or rectangular shapes). For the current sample or group of samples, a specific amount of samples within the same transform block or prediction block, defined by a predefined window, is taken for the parameter derivation. Using the above example where an affine predictor is employed, the parameter $\alpha^0$ can be derived from previously reconstructed sample or group of samples as follows where n is the group index.

$$z_n = \varphi\left(\alpha_{n-1}x + \beta_{n-1} + \gamma_{n-1}y\right)$$

The parameter for the first sample or group of samples can be initialized by some default values or calculated from neighboring blocks or shapes. Another possibility is to transmit the optimum parameters for the first sample or group of samples. In order to use as much previous samples as possible, a predefined scan pattern can be used to map the 2-dimensional residual block (or rectangular shape) to an 1-dimensional vector. For example, the samples or the groups of samples can be scanned vertically, horizontally, or directional similar to the scan directions of the transform coefficients. Again, the specific scan can be derived by a backward-driven scheme or it's signaled in the bit stream.

Another extension is the combination of the already presented example and a transformation using all three available components as input. Here, in this example, the residual signal is transformed using a transformation matrix that removes the correlation for the given transform block. This configuration is useful when the correlation between the planes is very large or extremely small. An example configuration would use Y'CoCg transformation in the case of input color spaces like R'G'B' or a principal component analysis approach. For the latter case, the transform matrix has to be signaled to the decoder in a forward manner or using a predefined set and rule known at encoder as well as decoder to derive the matrix values. Please note that this configuration may use the residual signal of all available components or planes.

As to the prediction domain, the following is noted.

The prediction domain can be, as described above, the spatial domain, i.e., operating on the residual, or frequency domain, i.e., operating on the residual after applying a transformation like DCT or DST. Furthermore, the domain can be a composition of both by transmitting the information to the decoder. In addition to the domain for the prediction, parameters related to the domain can be transmitted or derived by a backward-driven scheme.

Related to the domain parameters is an additional sub sampling of the chroma component, i.e., a chroma block (or rectangular shape) is scaled down horizontally, vertically, or both. In such a case, the prediction source might be down sampled as well or a set of prediction mode has to be selected that consider different resolution in spatial domain, frequency domain, or both. Another possibility is to upscale the prediction target so that the dimension of the prediction source and the prediction target match each other. The downscaling further improves the compression efficiency, especially for very flat areas in the image or video. For example, the prediction source contains both low and high frequencies but the chroma block (or rectangular shape) contains of low frequencies only. In this example, the sub sampling of the prediction source would removes the high frequencies and a less complex prediction mode can be employed and connected to that less information has to be transmitted to the decoder. Please note that the signaling of a downscaling usage might be done for each transform block, or for each prediction block, or even for a group of prediction blocks or for the whole image.

In addition to the additional down sampling approach, a bit depth adjustment might be transmitted to the decoder too. This case occurs when the precision of the samples are different along the different components. One possible way is to reduce or increase the number of bits for the source. Another possible configuration might increase or decrease the bit depth of the target and corrected the final result back to the correct bit depth. A further option is the usage of a set of predictors suitable for the different bit depth. Such a prediction mode would consider the different bit depth by the prediction parameters. The signaling level for the bit depth correction can be done for each block or shape, or for the whole picture or sequence, depending on the variation of the content.

As the prediction source, the following is noted.

The prediction source can be the first component or all available component. For each block (or rectangular shape), the prediction source might be signaled by the encoder. Alternatively, the prediction source can be a dictionary contains all possible blocks, whether prediction or transform block, from all available components and the prediction source that should be used for the prediction is signaled to the decoder by a syntax element in the bit stream.

As to the parameter derivation, the following is noted.

The parameters may, exemplarily, derived from the causal neighbourhood of the block—in the decoder so as to perform the elsewhere mentioned backward adaptivity or in the encoder, so as to signal the result in the data stream so as to drive the decoder in a forward-adaptive manner—by solving a least square error (LSE) optimization problem. The LSE can be formulated as:

$$\min_{\alpha,\beta,\gamma}\|z - \varphi\,(\alpha x + \beta + \gamma\gamma)\|^2$$

Minimizing this equation with respect to $\alpha$. The parameter for the equation has a closed form solution calculated as:

$$\alpha = \frac{A_1}{A_1}$$

where $A_1$ is the covariance between $z$ and $\varphi(\alpha x + \beta + \gamma\gamma)$, and $A_2$ is the variance of $z$.

An Integer implementation is implemented for this method to replace the division operation by a lookup table and a multiplication operation. $A_2$ is descaled in order to reduce the table size while $A_1$ is descaled in order to avoid multiplication overflow. Only the most significant bits $n_A{}^1$ and $n_A{}^2$ are kept from $A_1$ and $A_2$. $A'_1$, and $A'_2$ can be derived as:

$$A^1 = [A = r_A] << r_A$$

where $$r_A = \max\left(bd\,(A) - n_{A1}\ 0\right)$$

Where ($bd\,(A)$ is the bitdepth of the value of A calculated by $\log_2 A$.
Now $Aa^1$ can be recalculated as $$a' \approx \frac{[A_1 >> r_{A_1}] = r_{A_1}}{[A_2 >> r_{A_2}] = r_{A_2}} << n_a$$

$$\frac{(1 << n_{table})[[A_1 >> r_{A_1}] << (r_{A_1} + n_a)]}{[A_2 >> r_{A_2}] >> (r_{A_2} + n_{table})} =$$

$$\left[\frac{(1 << n_{table})}{(A_2 >> r_{A_2})}\right][[A_1 >> r_{A_1}] << (r_{A_1} + n_a - r_{A_2\_} n_{table})]$$

Now the division can be represented by a lookup table $$\left[\frac{(1 << n_{table})}{\left[A_2 >> r_{A_2}\right]}\right]$$

whose elements a re represented by $n_{table}$ bits. The index for this table is calculated as $[A_2>>r_{A_2}]$ and the table size is $n_{A_2}$.

Please note that in the above minimization problem, y represents the residual signal which, for the respective inter-component predicted block 440, is losslessly transmitted within the data stream. In other words, y is the correction signal for the inter-component predicted block 440. Same may be determined iteratively with, in each iteration, performing the solving of the above outlined LSE optimization problem. In this manner, the encoder may optimally decide on performing or not performing inter-component prediction, in choosing the inter-component prediction parameters such as prediction mode, prediction source and so forth.

As to the parameter signaling, the following is noted.

The prediction itself might be switchable and a header flag specifying the usage of the residual prediction should be transmitted in the beginning of the bit stream. When prediction is allowed, a syntax element specifying its local usage is embedded in the bit stream for a block 440, which as described before may be a residual block (or rectangular shape), a transform block (or rectangular shape), or even a group of transform blocks (or rectangular shapes). The first bit might denote whether the prediction is enabled or not and the following bits might denote the prediction mode, the prediction source, or the prediction domain and the related parameters. Please note that one syntax element can be used to enable or disable the prediction for both chroma components. It is also possible to signal the usage of the prediction as well as prediction mode and source for each second (e.g. chroma) component separately. Again, in order to achieve a high adaptation to the residual signal, a sorting criterion might be used to signal the prediction mode. For example, the most used prediction mode is one, then a sorted list would contain the mode one at index zero. Only one bit may then be used for signaling the most probable mode one. Furthermore, the usage of the prediction might be restricted In the case of applying the inter-component prediction on residuals, the correlation might be high if the same prediction mode for generating the residual is used among the different color components. Such a restriction is useful in intra predicted blocks (or rectangular shapes). For example, this inter-component prediction can be applied only if the same intra prediction mode as used for block (or rectangular shape) 442, which may be luma, is used for the block (or rectangular shape) 440, which may be chroma.

That is, the in the latter case, the block-wise adaptation of the inter-component prediction process would involve checking whether block 440 is associated with a spatial prediction mode as far as the prediction by predictor 222₂ is concerned, and whether the spatial prediction mode coincides, or does not deviate by more than a predetermined amount, from the spatial mode using which the co-located block 442 is predicted by predictor 222₁. The spatial prediction mode may, for example, comprise a spatial prediction direction along which already reconstructed samples neighbouring block 440 and 442, respectively, are extrapolated into block 440 and 442, respectively, in order to result in the respective prediction signal 220₂ and 220₁, respectively, which is then combined with z and x, respectively.

In an embodiment, the prediction source is the luma component. In this advantageous embodiment, which is depicted in FIGS. 1 and 2 if the interconnections between components 108/208 and 110/210 are left off, the processing of the luma is unchanged and the resulting reconstructed residual of the luma plane is used for prediction. As the consequence, the prediction source is not transmitted in the bit stream.

In another embodiment, the prediction source is transmitted for a 1 block or shape 440, such as a residual block, a group of residual blocks or shapes, e.g., for the size where the intra or inter prediction is applied.

For example, the prediction source is luma for the first chroma component and luma or the first chroma component for the second chroma component. This advantageous embodiment is similar to a configuration allowing all available planes as prediction source and corresponds to FIGS. 1 and 2.

Figure 6:
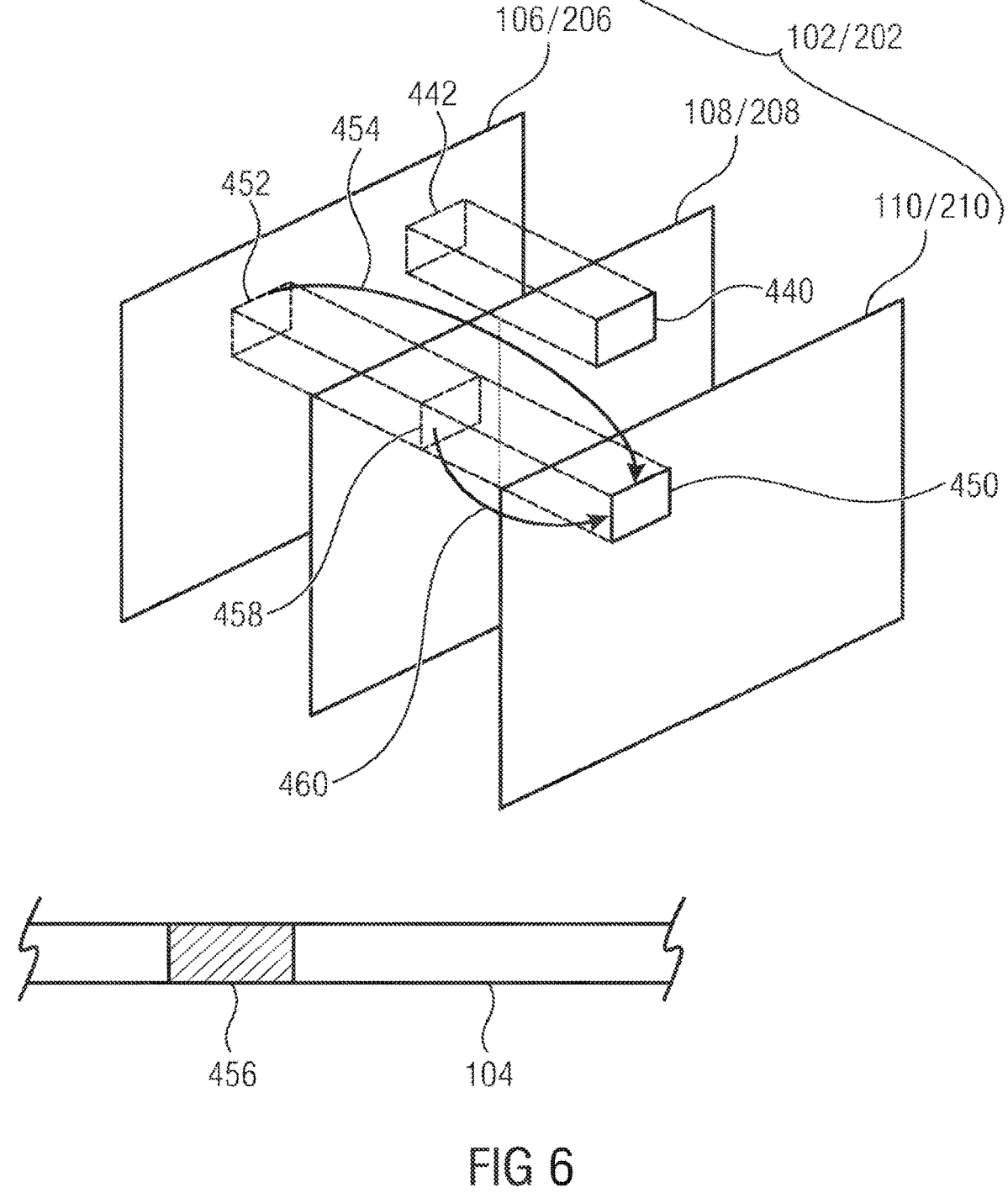
FIG. 6 schematically shows a picture with three components so as to illustrate an embodiment where one component constantly serves as the base (first) component in accordance with an embodiment.

To illustrate the aforementioned embodiments, see FIG. 6. A three-component picture 102/202 is shown. The first component 106/206 is coded/decoded using hybrid (de) coding without any inter-component prediction. As far as the second component 108/208 is concerned, same is partitioned into blocks 440, one of which is exemplarily shown in FIG. 6 just as it was the case in FIG. 5. In units of these blocks 440, the inter-component prediction is adapted with respect to, for example, α as it was described above. Likewise, picture 102/202 is partitioned into blocks 450 as far as the third component 110/210 is concerned with one such block being representatively shown in FIG. 6. As described with respect to the just outlined two alternatives, it may be that the inter-component prediction of block 450 is performed by using the first component 106/206 as a prediction source inevitably, i.e. the co-located portion 452 of the first component 106/206. This is indicated using continuous-lined arrow 454. In accordance with a second alternative just described, however, a syntax element 456 in the data stream 104 switches between using the first component as the prediction source, i.e. 454, and using the second component as the prediction source, i.e. inter-component predicting block 450 on the basis of the co-located portion 458 of the second component 108/208 as indicated by arrow 460. In FIG. 6, the first component 106/206 may be, for example, the luma component, whereas the other two components 108/208 and 110/210 may be chroma components.

It is noted that with respect to FIG. 6 that, possibly, the partitioning into blocks 440 for the second component 108/208 may be signaled within the data stream 104 in a manner independent from, or allowing a deviation from, partitioning of component 110/210 into blocks 450. Naturally, the partitioning could be the same as well and could even be adopted from the one signaled form, or used for, the first component as it is the exemplary case in FIG. 10 described later.

Figure 7:
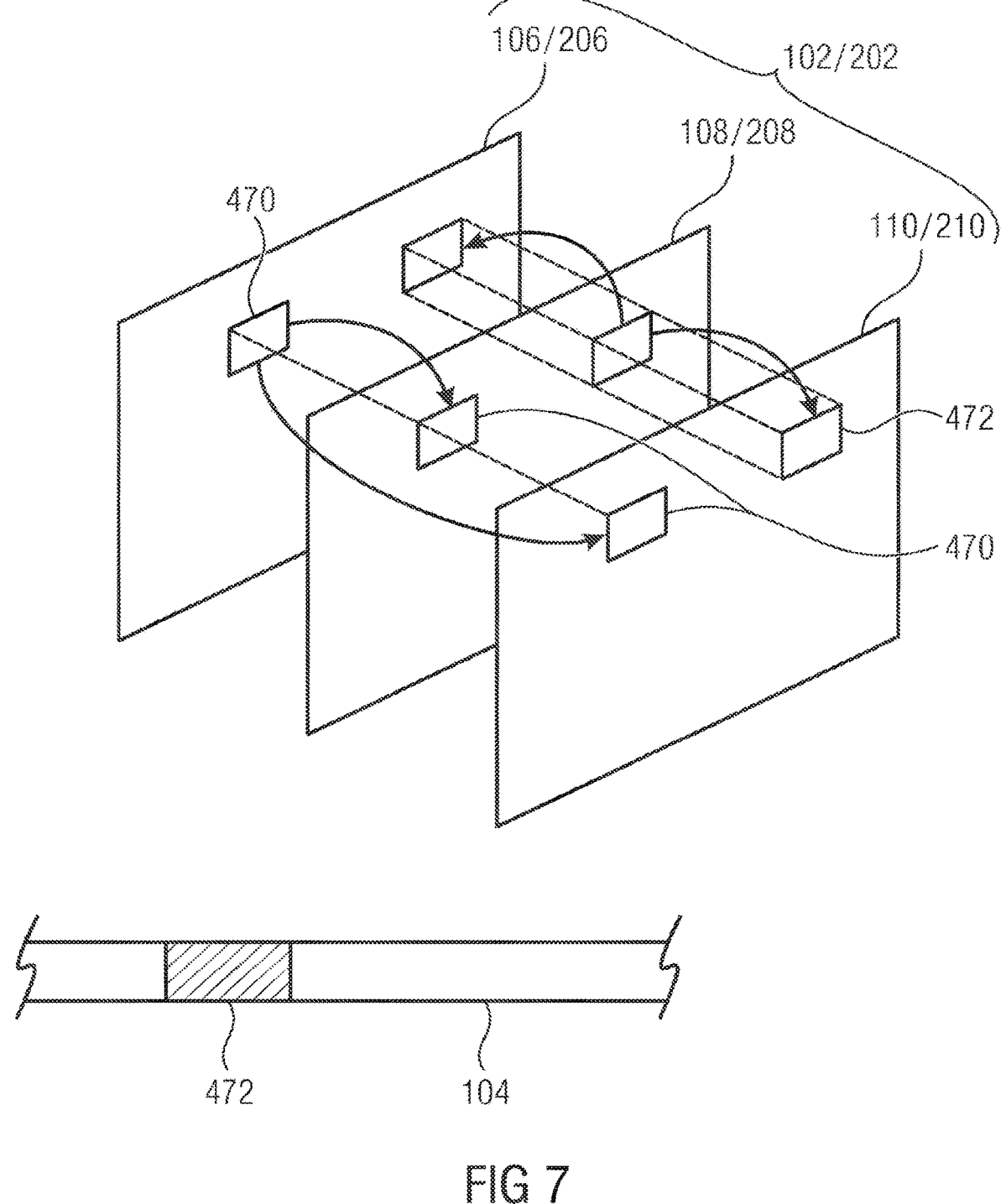
FIG. 7 shows schematically a picture with three components where each of the components may serve, alternately, as the first (base) component in accordance with an embodiment.

A further embodiment, which was just outlined above, is the possibility that all components of picture 110/210 may, alternately, serve as a prediction source. See FIG. 7. In FIG. 7, all components 106 to 110/206 to 210 have a common partitioning into blocks 470 associated therewith with one such block 470 being exemplarily illustrated in FIG. 7. The partitioning or subdivision into blocks 470 may be signaled within the data stream 104. As already stated above, block 470 may be residual or transform blocks. Here, however, any component may form the "first component", i.e. the prediction source. A syntax element 472 and a data stream 104 indicates for block 470 as to which among components 106 to 110/206 to 210 forms the prediction source for, for example, the other two components. FIG. 7, for example, illustrates another block 472, for which the prediction source is chosen differently as illustrated by the arrows in FIG. 7. Within block 470, the first component serves as the prediction source for the other two components, in the case of block 472 the second component assumes the role of the first component.

With respect to FIGS. 6 and 7, it is noted that the scope at which the syntax elements 456 and 472 indicate the prediction source may be chosen differently, i.e. for each block 450 and 470/72 individually, or for groups of blocks or even the whole picture 102/202.

In a further embodiment, the prediction source can be all available component or a subset of the available component. In this advantageous embodiment, a weighting of the source may be signaled to the decoder.

In an advantageous embodiment, the prediction domain lies in the spatial domain. In this embodiment, the residual for a whole residual block or shape might be used or only a specific part of the residual block or shape, depending on the signaling configuration. The latter case is given when the prediction is signaled individually for each transform block or shape and a further subdivision of residual blocks or shapes into smaller transform blocks or shapes are allowed.

In a further embodiment, the prediction domain lies in the frequency domain. In this advantageous embodiment, the prediction is coupled to the transform block or shape size.

In a further embodiment, the prediction domain can be in the spatial or frequency domains. In this embodiment, the prediction domain is specified separately, either by forward signalization or backward-driven estimation depending on the local statistics.

Figure 8:
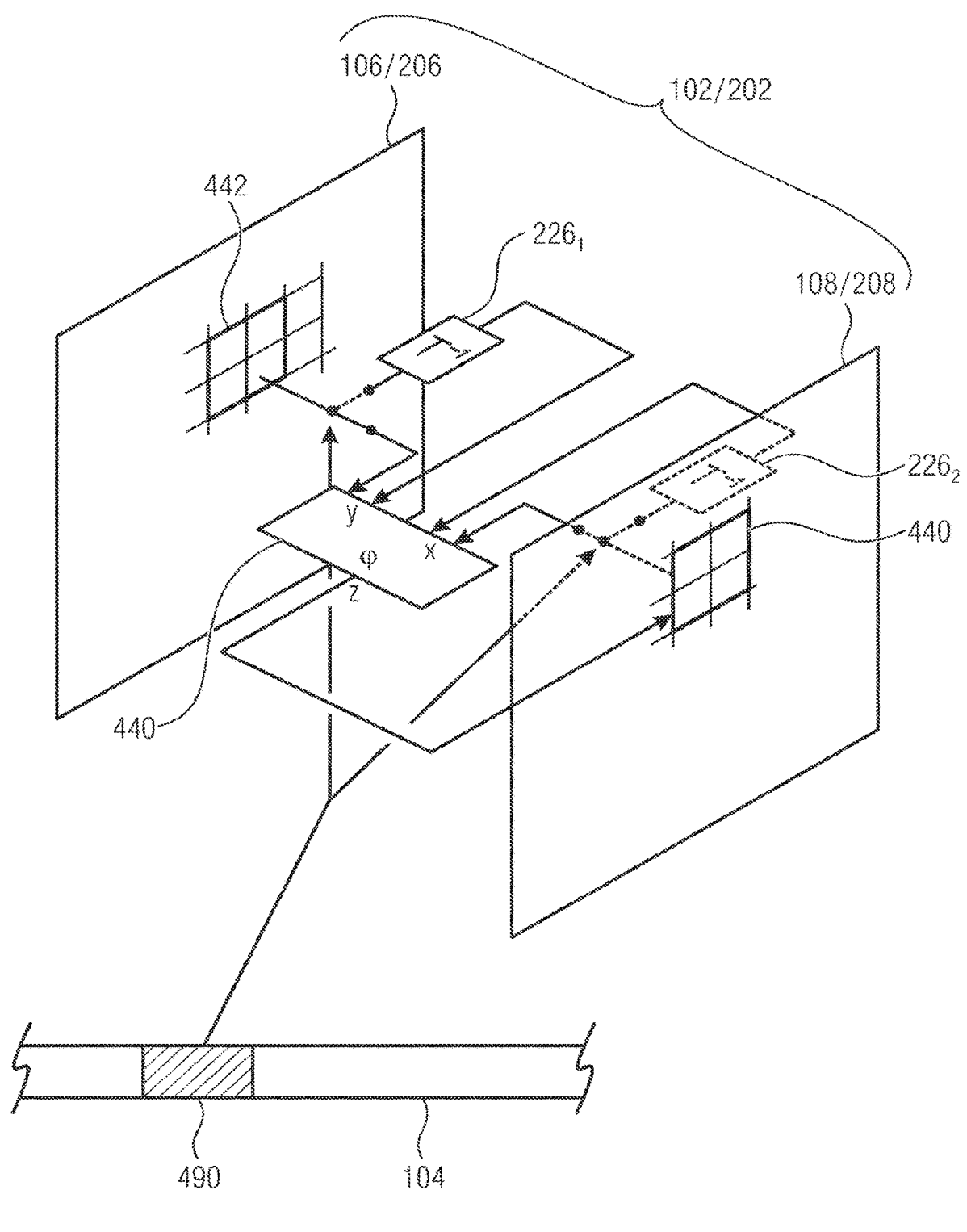
FIG. 8 schematically shows a possibility according to which the domain for inter-component prediction is adaptively changed.

The latter circumstance is illustrated in FIG. 8. In FIG. 8, merely two components of picture 102/202 are exemplarily shown. Further, a currently inter-component predicted block 440 and its spatially corresponding portion 442 are shown as well as a syntax element 490 contained in the data stream 104 so as to signal for block 440 whether the inter-component prediction by reconstruction module 400 implemented, for example, using the model involving function q as discussed above, is performed in transform domain or spatial domain. In particular, FIG. 8 illustrates the processing in the decoder for illustration purposes. First of all, from the data stream 104, the correction signal of the second component 208 relating to block 440 is extracted from the data stream, and likewise a residual signal is extracted from the data stream 104 for the first component 206 as far as the spatially corresponding portion 442 is concerned. If the syntax element 490 indicates for block 440 the use of the spectral domain, these signals are input into reconstruction module 400 directly with the inter-component predicted output z replacing the correction signal of block 440 for the further reconstruction of the second component 208 of picture 202. However, if the syntax element 490 indicates the usage of the spatial domain, the signals extracted from the data stream 104 for block 440 and spatially corresponding portion 442 are subject to inverse transformation 226 prior to the processing by reconstruction module 400. In the case of using the spectral domain, a combination of x and y, so as to obtain z is performed spectral-component-wise, and in the case of using the spatial domain, the combination of x and y so as to obtain z by module 400 is performed sample-wise.

Again, the syntax element 490 may signal the domain to be used for inter-component prediction for block 440 individually, for groups of blocks 440 or for the whole picture or for an even larger scope, such as a group of pictures.

In a further embodiment, both prediction domains are involved in the prediction process. In this advantageous embodiment of the invention, a prediction is made first in the spatial domain, and a further prediction is applied in the frequency domain with both predictions using different prediction modes and sources.

In an embodiment, the chroma block or shape can be subsampled horizontally, vertically, or both by some factors. In this embodiment, the down scale factor can be equal to the power of two. The usage of the down sampler is transmitted as a syntax element in the bit stream and the down sampler is fixed.

In a further embodiment, the chroma block or shape can be subsampled horizontally, vertically, or both by some factors. The factor can be transmitted in the bit stream and the down sampler is selected from a set of filters, where the exact filter can be addressed by an index transmitted in the bit stream.

In a further embodiment, the selected up sampling filter is transmitted in the bit stream. In this embodiment, the chroma blocks might be originally sub sampled, and hence, in order to use the prediction with a matching block or rectangle size, the up sampling has to be done before prediction.

In a further embodiment, the selected down sampling filter is transmitted in the bit stream. In this embodiment, the luma is down sampled in order to achieve the same block or rectangle size.

In an embodiment, a syntax element is signaled denoting the bit correction when the bit depth of the source and the target is different. In this embodiment, the luma precision can be decreased or the chroma precision can be increased in order to have the same bit depth for the prediction. In the latter case, the chroma precision is decreased back to the original bit depth.

In an embodiment, the number of prediction modes is two and the set of predictors is defined exactly as in the given example.

In a further embodiment, the number of prediction mode is one and the configuration is the same as described in the previous embodiment.

In a further embodiment, the number of predictors is freely adjustable with the set of predictors is defined exactly as in the given example. This embodiment is the more generic description of the example with a=1/m where m>0 denotes the prediction number or mode. Hence, m>0 denotes that the prediction should be skipped.

In a further embodiment, the prediction mode is fixed, i.e., the prediction is enabled. For this embodiment, one might enable the adaptive inter-plane prediction and set the number of predictors equal to zero.

In a further embodiment, the prediction is applied and the prediction parameters like a are derived from the neighbouring blocks or shapes. In this embodiment, the optimum a for a block or shape is calculated after the full reconstruction. The calculated a acts as parameter for the next block or shape in the local neighbourhood.

In a further embodiment, a syntax element is transmitted in the bit stream indicating the usage of the parameters derived from the local neighbourhood.

In a further embodiment, the parameters derived from the neighbourhood are used. In addition to that, a delta relative to the optimum parameters calculated in the encoder might be transmitted in the bit stream.

In a further embodiment of, the backward-driven selection scheme for the parameters are disabled and the optimum parameters are transmitted in the bit stream.

In a further embodiment, the usage of the starting a as well as the existing of a delta a in the bit stream is signaled separately.

In an embodiment, the signaling of prediction mode, prediction source, and prediction parameters are restricted to the same regular prediction mode. In this embodiment, the information related to the inter-plane prediction is transmitted only when the intra prediction mode for the chroma component is the same as used for the luma component.

In a further embodiment, the block is partitioned into windows of different sizes and the parameters for the current window are derived from the reconstructed previous window within the block. In a further embodiment, parameters for the first window are derived from reconstructed neighbouring blocks.

In a further embodiment of the, a syntax element is transmitted in the bit stream indicating the usage of the parameters derived from the locally neighbourhood to be used for the first window.

In a further embodiment, the windows can be scanned in a vertical, horizontal or vertical direction.

In a further embodiment, the parameters for the current window are derived from the previous window where the previous window is decided according to the scan position of the transform coefficients sub blocks.

In a further embodiment, the window scanning is limited to one scanning direction.

In a further embodiment, the parameters are derived using an integer implementation by using a lookup table and a multiplication operation instead of a division.

In an embodiment, a global flag transmitted in the header of the bit stream denote the usage of the adaptive inter-plane prediction. In this embodiment, the flag is embedded in the sequence level.

In a further embodiment, a global flag is transmitted in the header of the bit stream, with the embodiment in the picture parameter level.

In a further embodiment, the number of predictors is transmitted in the header of the bit stream. In this embodiment, the number zero denotes that prediction is enabled, a number unequally to zero denote that the prediction mode is selected adaptively.

In an embodiment, the set of prediction mode is derived from the number of prediction modes.

In a further embodiment, a set of prediction mode is known at the decoder and the decoder specifying all model parameters of the prediction.

In a further embodiment, the prediction modes are all linear or affine.

In an embodiment, the set of predictors is hybrid, i.e., containing simple prediction modes using other planes as prediction source, and containing more complex prediction modes using all available planes and transform the input residual signals into another component or plane space.

In an embodiment, the usage of prediction is specified for each transform block or shape for each chroma component. In this embodiment, this information may be skipped when the luma component consists of zero-valued residual at the same spatial location.

In an embodiment, the modes are transmitted using truncated unary decomposition. In this embodiment, different context models are assigned for each bin index, however, limited to a specific number, e.g., by three. Furthermore, the same context models are used for both chroma components.

In a further embodiment, different chroma planes use different context model sets.

In a further embodiment, different transform block or shape sizes uses different context model sets.

In a further embodiment, the mapping of bins to prediction mode is dynamic or adaptively. In this embodiment, from decoder perspective, a decoded mode equal to zero denotes the most used mode up to the decoded time.

In a further embodiment, the prediction mode, and the prediction source if using a configuration allowing different prediction sources, is transmitted for a residual block or shape. In this embodiment, different block or shape sizes may use different context models.

The embodiment described next, especially concerns an example for how to code the prediction parameters for the "Cross Component Decorrelation" described so far.

Although not restricted thereto, the following description may be thought of as referring to the alternative where the dependent (second) component is reconstructed based on the reference (first) component signal x and the residual (correction) signal y via computing $z=ax+y$ with using z as the prediction of the dependent component signal. The prediction may be applied in the spatial domain, for example. As in the examples above, the inter-component prediction may be applied to a hybrid-coding residual signal, i.e., first and second component signal may represent a hybrid coding's residual signal. The following embodiment concentrates, however, on the signaling of a: this parameter is coded in a sub-picture basis such as, for example, in units of residual blocks into which the multi-component picture is subdivided. The following is about the fact that the signal-able states of a should advantageously variable, too, in order to account for the fact that the range of optimal values for a depend on the sort of picture content which, in turn, varies in scope/units larger than residual blocks. Thus, in principle, the details set out below with respect to the transmission of a may be transferred to the other embodiments outlined above as well.

The cross-component decorrelation (CCD) approach utilizes the remaining dependency between different color components enabling higher compression efficiency. An affine model can be employed for such an approach and the model parameters are transmitted in the bit stream as side information.

In order to minimize the side information cost, a limited set of possible parameters are transmitted only. For example, a possible CCD implementation in High Efficiency Video Coding (HEVC) could use a linear prediction model instead of an affine prediction model and the only mode parameter, i.e., the slope or gradient parameter a, could be limited in the range from 0 to 1 and be quantized non-uniformly. Particularly, the limited set of values for a could be a $\in\{0, \pm0.125, \pm0.25, \pm0.5, \pm1\}$.

The selection of such a quantization for the linear prediction model parameter could be based on the fact that the distribution of a is symmetrically concentrated around the value 0 for natural video content stored in the $Y'C_bC_r$ color space. In the $Y'C_bC_r$, the color components are decorrelated by using a fixed transformation matrix to convert from R'G'B' before entering the compression stage. Due to the fact that a global transformation is often sub-optimal, the CCD approach can achieve higher compression efficiency by removing the remaining dependency between the different color components.

However, such an assumption does not hold true for different kind of content, especially for natural video content stored in the R'G'B' color space domain. In this case, the gradient parameter $\alpha$ is often concentrated around the value 1.

Similar to the case given above, the distribution becomes completely different when CCD is extended to the first chroma component as the prediction source. Hence, it may be beneficial to adjust the CCD parameters according to the given content.

For example, for $Y'C_bC_r$, the quantization of a can be set to (0, ±0.125, ±0.25, ±0.5, ±1) while for R'G'B' the quantization of a could be inverted, i.e., (0, ±1, ±0.5, ±0.25, ±0.125). However, allowing different entropy coding paths introduces additional issues. One problem is that the implementation becomes more expensive in terms of area and speed for both hardware and software. In order to avoid this drawback, the parameter range can be specified in the picture parameter set (PPS) level where the usage of CCD is also indicated.

That is, a syntax element signaling a is transmitted at a sub-picture level/granularity, e.g., individually for a residual block. It could be called res_scale_value, for example. It could be, for example, coded using a (truncated) unary binarization combined with binary arithmetic coding of the bin string. The mapping of the (non-binarized) values of res_scale_value onto a could be implemented such that the mapping is varied using the PPS, i.e., for the complete picture or even at larger scope such as on a per picture sequence basis. The variation could vary the number of representable a values, the order of representable a values and the selection of representable a values, i.e., their actual values. Merely allowing for switching the order among the representable a values or restricting the representable a values to positive or negative values only is one way to provide for content adaptivity, but the embodiments outlined further below allow—by merely minor increased overhead—for an even increased flexibility in varying the mapping from the sub-picture granularly signaled res_scale_value to a values such as a variation of the size, members and member order of the mapping's co-domain (representable set of a values), and it turned out that the advantages provided by this provision in terms of bit savings for transmitting res_scale_value overcompensates—seen over a typical blend of video contents coded in YCC or RGB—the necessity of signaling the variation of the mapping.

The specification of the range for a can be done, for example, as follows. In the case of $Y'C_bC_r$, the advantageous sub-set can be for example (0, ±0.125, ±0.25, ±0.5) while it can be (0, ±0.5, ±1) or (0, 0.5, 1) or even (0, 0.5, 1, 2) for R'G'B'. In order to achieve the mentioned behavior, the range can be specified in the PPS using two syntax elements representing two values. Given the above example and the fact that the prediction is performed with 3-point accuracy, i.e., the prediction sample values are multiplied by a and then right-shifted by 3, the range configuration for $Y'C_bC_r$ can be transmitted as [−3, 3].

However, with such a signaling, only the second and the third case for R'G'B' can be achieved using [2, 3] and [2, 4]. In order to achieve the first example for R'G'B', the sign has to be separated using an additional syntax. Furthermore, it is sufficient to transmit the delta for the second value with the first value serves as the starting point. For this example, the second R'G'B' configuration is [2, 1] instead of [2, 3].

In the case of prediction from the first chroma component, the range values can be specified separately for each chroma component. Note that this can be done even without the support for the prediction from the first chroma component.

Given the limit specified in the PPS, the parsing and reconstruction of the prediction parameter α is modified as follows. For the case without limit, i.e., a e {0, ±0.125, ±0.25, ±0.5, ±1} and a 3-point accuracy precision, the final $a_F$ is reconstructed as follows where $a_F$ denotes the parsed value from the bit stream: $a_F=1<<a_P$. This is modified according to $a_F=1<<(a_P+a_L)$ where $a_L$ denotes the offset for the smallest absolute value when the range lies completely in positive or negative range.

Both values are used to derive the limit on the number of bins parsed from the bit stream when $a_P$ is binarized using truncated unary code. Please note that the parsing of the sign might depend on the given range. A better way to utilize this aspect is to encode the sign before the absolute value of a. After the coding the sign, the number of maximum bins to be parsed from the bit stream can be derived. This case is useful when the range is asymmetric, e.g., it is [−1, 3].

Often, a different order is desired like (0, 1, 0.5), e.g., for some R'G'B' content. Such an inversion can be simply achieved by setting the range values according to [3, 2]. In this case, the number of bins parsed from the bit stream is still 2 (the absolute difference between the two range values is n=1 and the number of bins in case of truncated unary code is n+1). Then, the inversion can be achieved by two ways. The first option introduces a fixed offset, which is equal to 2 times the current value if no inversion is desired and the maximum representable value in the case of inversion. The second and more elegant way to do this is to expand to range transmitted in the PPS to a memory and access the corresponding value through a look-up operation. This approach leads to a unified logic and single path for both cases. For example, the case (0, 0.25, 0.5, 1) is signaled in the PPS by transmitting [1, 3] and a memory is created with the following entries (0, 1, 2, 3). On the other way, i.e., in the inverted case with the transmitted values [3, 1] in the bit stream, a memory is created with the following entries (0, 3, 2, 1). Using such an approach, the final a can be formulated as $a_F=1<<(LUT[a_P])$ where $LUT[a_P]$ denotes the look-up operation.

Figure 9A:
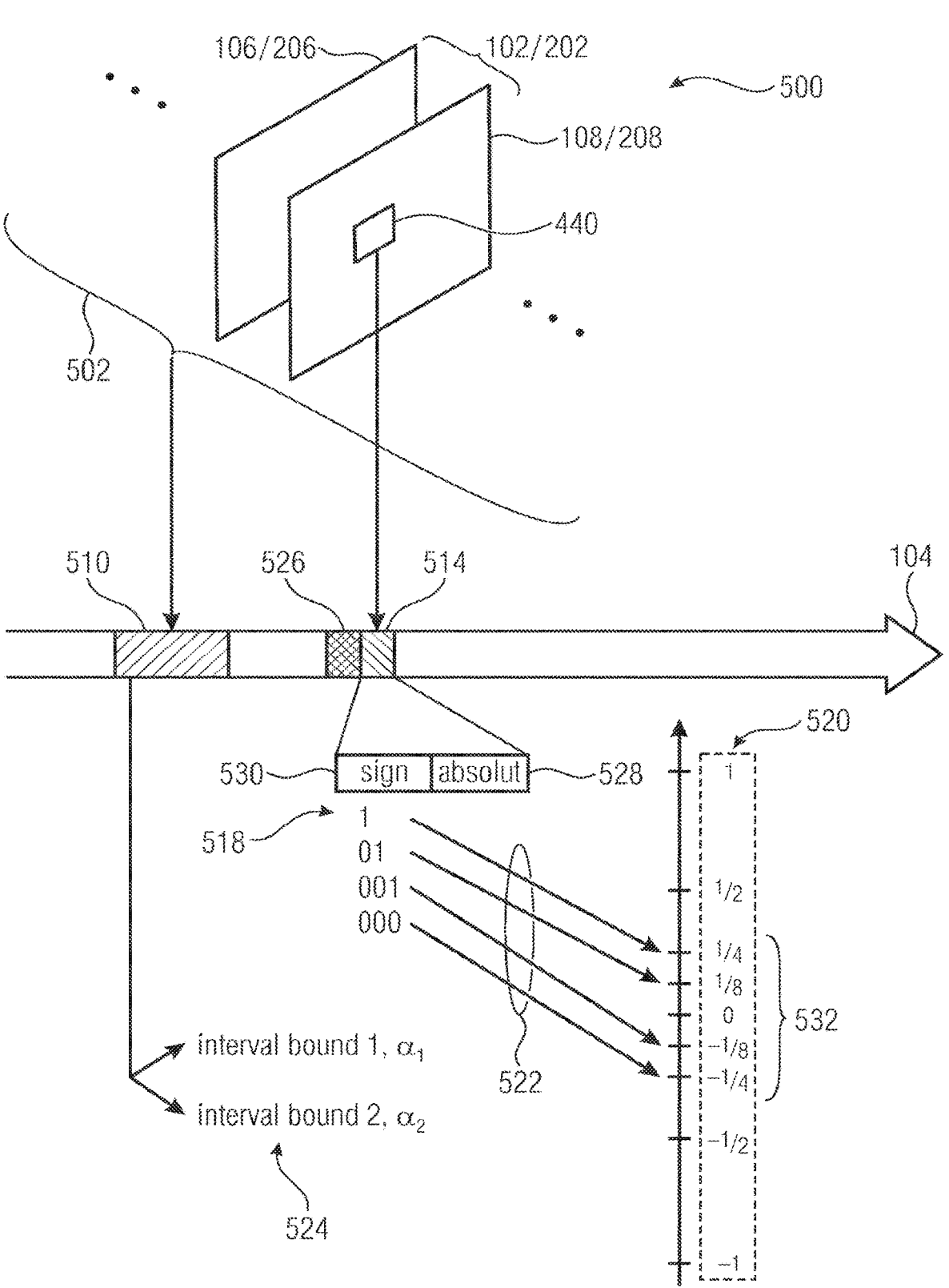
FIG. 9a schematically shows a possibility of signaling an inter-component prediction parameter.

In order to explain the most recently mentioned aspect in more detail, reference is made to FIGS. 9a, b and c. FIGS. 9a, b and c, in the following simply referred to as FIG. 9, exemplarily show one multi-component picture 102/202 exemplarily in a layered manner: the first (reference) component 106/206 behind the dependent (second) component (108/208).

Picture 102/202 may be part of a video 500.

Figure 9B:
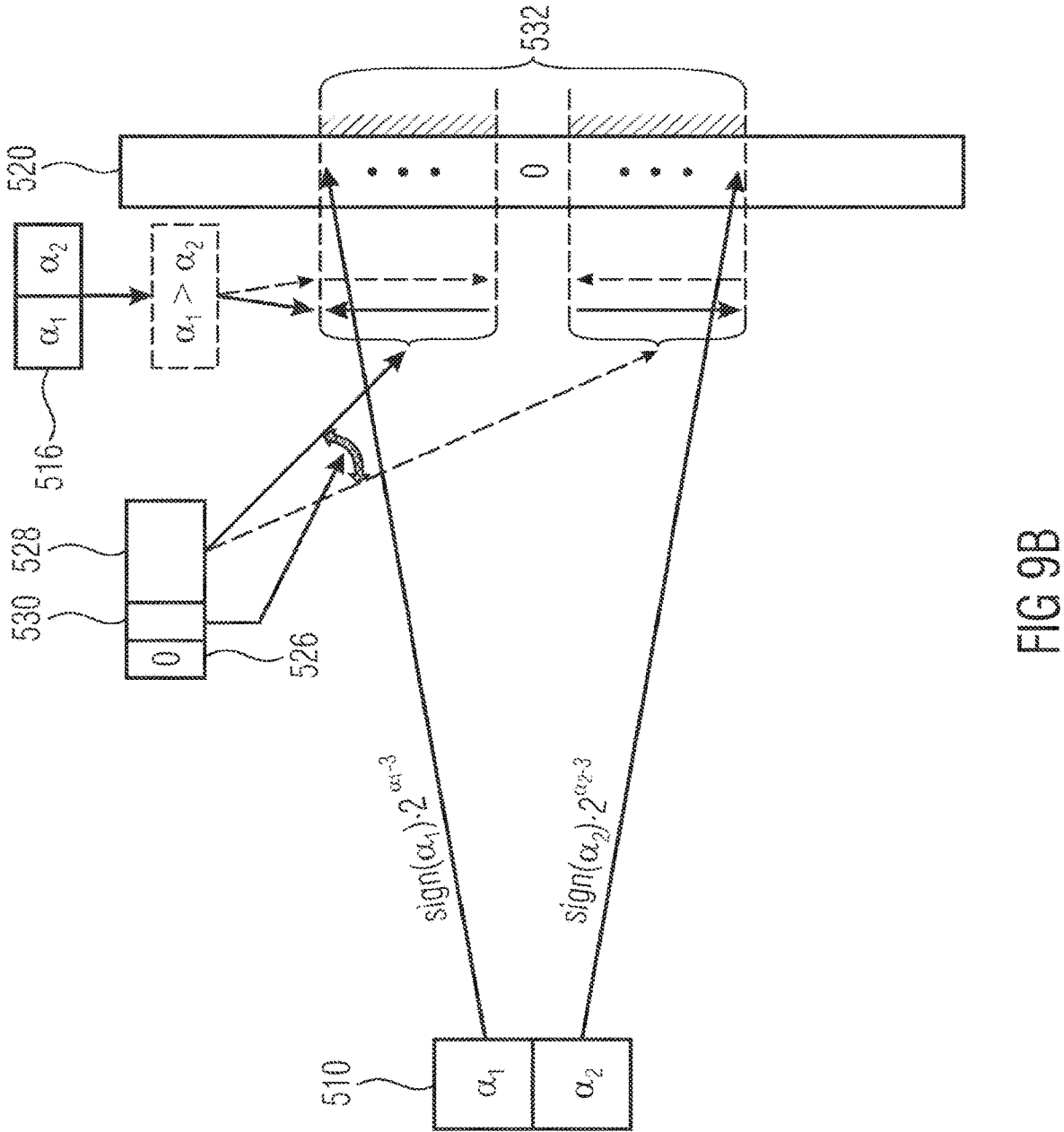
FIG. 9b shows the embodiment of FIG. 9a in more detail.
Figure 9C:
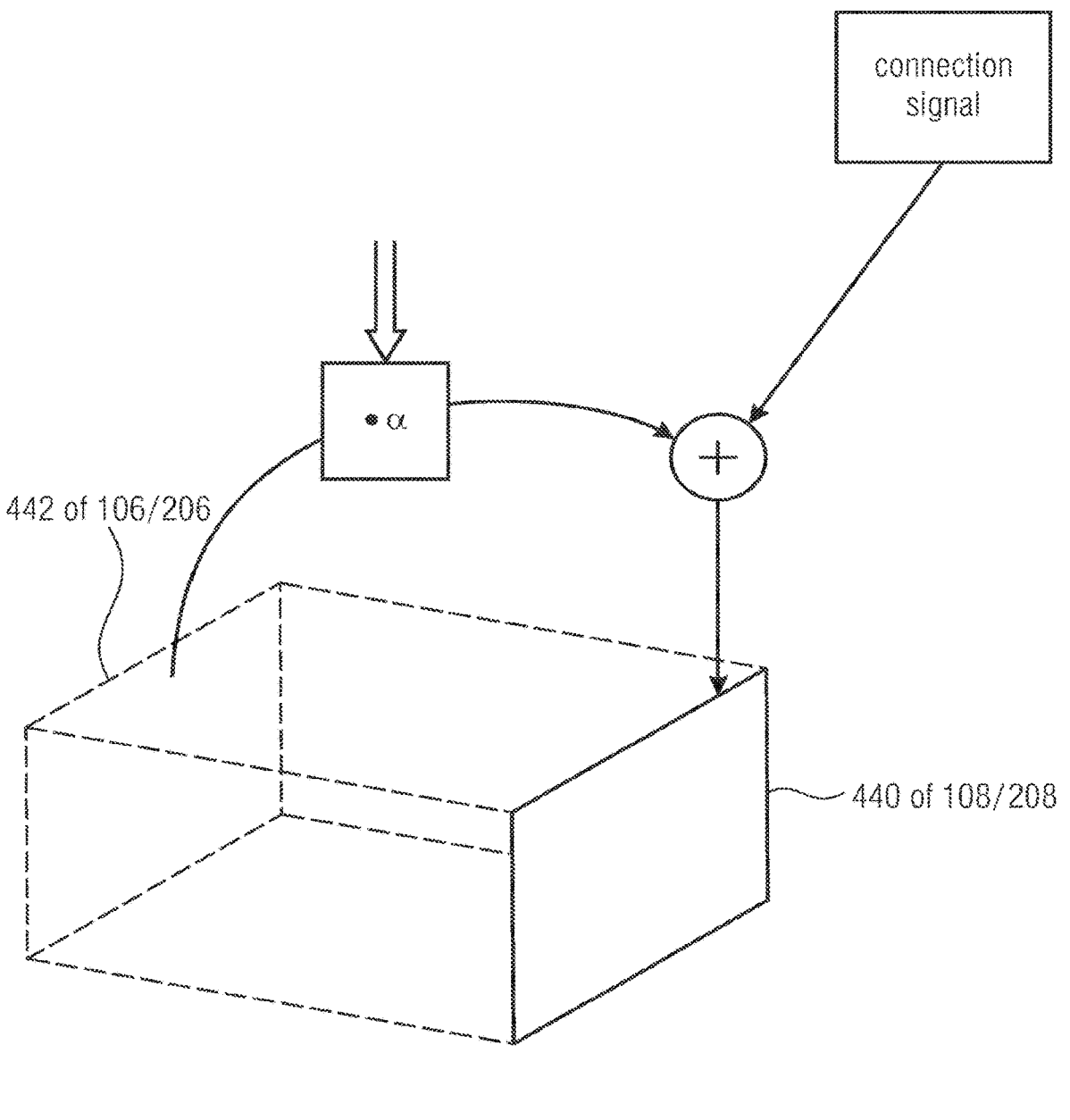
FIG. 9c schematically shows the application of the inter-component prediction parameter which FIGS. 9a and 9b relate to for illustration purposes.

The data stream 104, into which picture 102/202 is coded, comprises a high-level syntax element structure 510 which relates at least to the whole picture 102/202 or even beyond that to a picture sequence out of video 500 which comprises picture 102/202. This is illustrated in FIG. 9 using the curly bracket 502. Further, the data stream 104 comprises on a sub-picture level, first-weight syntax elements. One such first-weight syntax element 514 is exemplarily shown in FIG. 9 as pertaining to an exemplary residual block 440 of picture 102/202. The first-weight syntax element is for individually setting the first weight, i.e. a, in inter-component predicting the dependent component 108/208 on the basis of the co-located portion of reference component 106/206.

The first-weight syntax element is coded using a truncated unary binarization. An example for such TU binarization is shown in FIG. 9 at 518. As shown, such a TU binarization consists of a sequence of bin strings of increasing length. In the manner described above, the high-level syntax element structure 510 defines how the bin strings of binarization 518 are mapped onto possible values for a. An exemplary set of such possible values for a is shown in FIG. 9 at 520. In effect, the high-level syntax element structure 510 defines the mapping 522 from the set of bin strings 518 onto a subset of set 520. By this measure, it is feasible to keep the signalization overhead for switching between different inter-component prediction weights a at sub-picture granularity at lower bit consumption as the sub-picture signaling may merely discriminate between a smaller number of possible values for a.

As described above, it is feasible that the syntax element structure 510 allows the decoder to derive first and second interval bounds 524 therefrom. The corresponding syntax elements in structure 510 may be coded independent/separately from each other, or relative to each other, i.e., differentially. The interval bound values 524 identify elements out of sequence 520, namely using the above-presented exponential function which may be implemented using respective bit shifts. By this measure, the interval bounds 524 indicate to the decoder the co-domain of mapping 522.

As also described above, the case of a being zero may be signaled to the decoder separately using a respective zero flag 526. If the zero flag has a first state, the decoder sets a to be zero and skips reading any first-weight syntax element 514 for the respective block 440. If the zero flag has the other state, then the decoder reads the first-weight syntax element 514 from data stream 104 and determines the actual value of the weight using mapping 522.

Further, as outlined above merely an absolute part 528 of the first-weight syntax element 514 may be coded using the truncated unary binarization, and a sign part of the first-weight syntax element 514 may be coded previously. In this way, it is feasible for encoder and decoder to appropriately set their lengths, i.e., the number of bin strings, of binarization 518 for the absolute path 528 as the sign part 530 determines whether the value a of block 440 belongs to those members of the co-domain 532 of mapping 522 out of set 520 which have the positive a values, or to the other part thereof consisting of the negative a values. Naturally, the sign part 530 of the first-weight syntax element 514 may not be present and may not be read by a decoder in case the decoder derives from the high-level syntax element structure 510 that the co-domain 530 merely comprises positive a values or merely negative a values, exclusively.

As also became clear from the above discussion, the interval bounds 524 and the order in which same are coded in the high-level syntax element structure 510 may determine the order in which the absolute part 528 "traverses" the members of co-domain 532.

Figure 10:
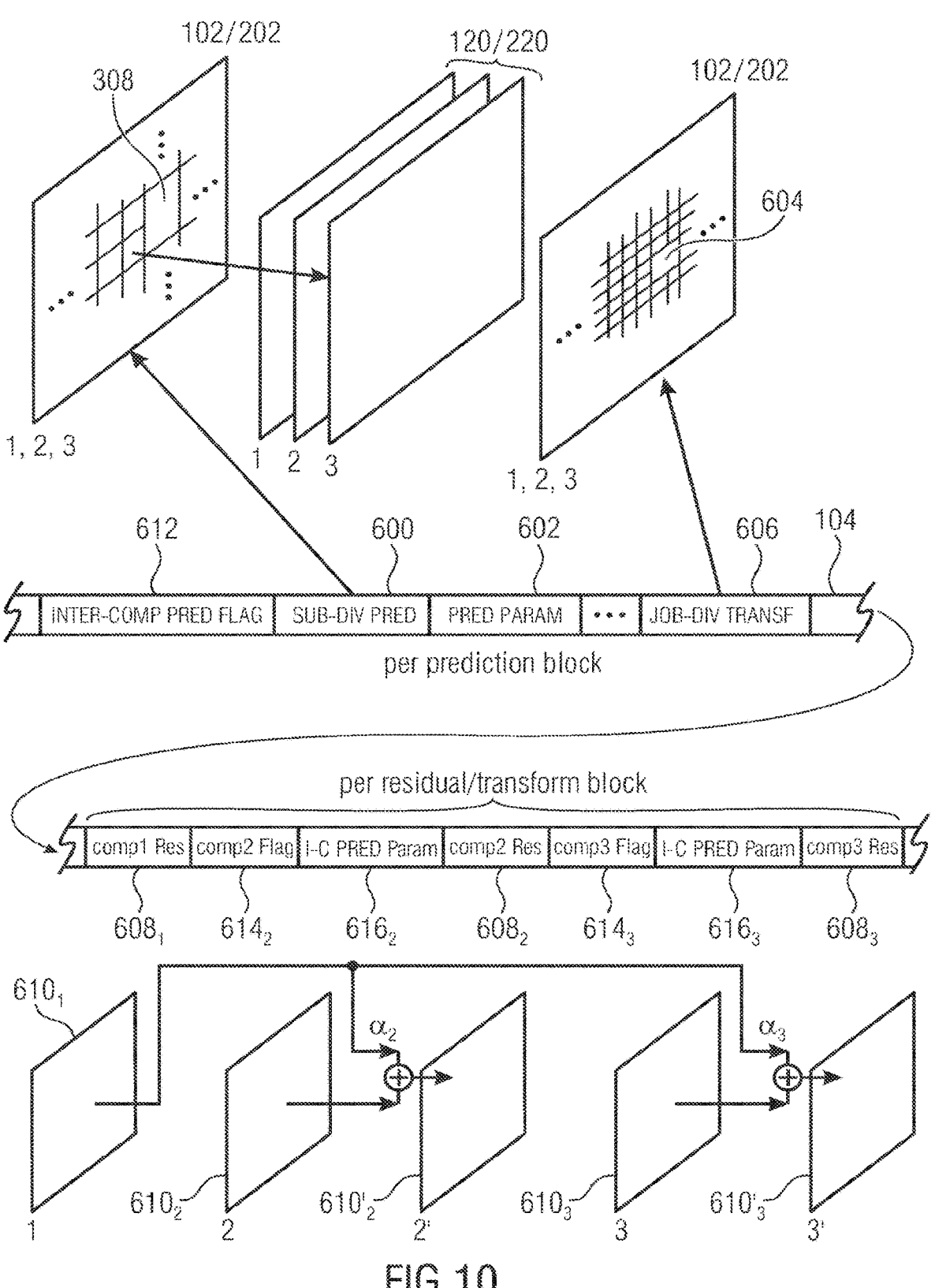
FIG. 10 schematically shows a forward adaptive inter-component prediction in accordance with an embodiment.

With respect to FIG. 10, a further concrete embodiment summarizing certain aspects already described above, is illustrated. According to the embodiment of FIG. 10, encoder and decoder subdivide the picture 102/202 commonly with respect to all three components as far as the hybrid prediction within predictors 122/222 is concerned. In FIG. 10, the components are denoted by "1", "2" and "3", respectively, and written below the respectively illustrated picture. The subdivision/partitioning of picture 102/202 into prediction blocks 308 may be signaled within the data stream 104 via prediction related subdivision information 600.

Per prediction block 308, prediction parameters may be signaled within the data stream 104. These prediction parameters are used for hybrid encoding/decoding each component of the picture 102/202. The prediction parameter 602 may be signaled within the data stream 104 for each component individually, for all components commonly or partially component specifically and component-globally. For example, the prediction parameter 602 may, for example, distinguish between, inter alia, spatially and/or temporally predicted blocks 308 and while, for example, this indication may be common among the components, the temporal prediction-related parameters among prediction parameter 602 may be signaled within the data stream 104 component-specifically. Using the implementation of FIGS. 1 and 2, for example, predictors 122/222 use the prediction parameter 602 in order to derive, for each component, the prediction signal 120/220.

Further, the data stream 104 signals, in accordance with the embodiment of FIG. 10, a subdivision/partitioning of picture 102/202 into residual or transform blocks, here denoted by reference sign 604. The residual/transform-related subdivision information within the data stream 104 is indicated using reference sign 606. As described above with respect to FIG. 3, the subdivision/partitioning of picture 102/202 into prediction blocks 308 on the one hand and residual/transform blocks 604 on the other hand, may at least partially be coupled to each other in that at least partially the partitioning into residual/transform blocks 604 forms an extension of the hierarchical multi-tree subdivisioning of picture 102/202 into prediction blocks 308 or some hierarchical intermediary subdivision into, for example, coding blocks.

Per residual/transform block, the data stream 104 may comprise residual data $608_1$, $608_2$, and $608_3$ in the form of, for example, quantized transform coefficients. Dequantizing and inverse transforming the residual data $608_1$ to $608_3$ reveals a residual signal in the spatial domain for each component, namely $610_1$, $610_2$ and $610_3$.

As illustrated in FIG. 10, the data stream 104 further comprises an inter-component prediction flag 612 which, in the present example, signals for picture 102/202 globally as to whether or not inter-component prediction is applied/used. If the inter-component prediction flag 612 signals that inter-component prediction is not used, the residual signals $610_1$ to $610_3$ are not combined with each other, but are separately, with respect to each component, used so as to correct the prediction signal 120/220. If, however, the inter-component prediction flag 612 signals the usage of inter-component prediction, the data stream 104 comprises, per residual/transform block, for each dependent component 2 and 3, a flag $614_2$, $614_3$ signaling whether or not for the respective component $\frac{2}{3}$ inter-component prediction is applied. If signaled to be applied, the data stream 104 comprises for the respective residual/transform block for the respective component $i=\frac{2}{3}$ an inter-component prediction parameter $616_2$ and $616_3$, respectively, corresponding to, for example, a of the above outlined description.

Thus, if for example the flag $614_2$ indicates for the second component that inter-component prediction is to be used, the inter-component prediction parameter $616_2$ indicates the weight at which the residual signal $610_1$ is to be added to the residual signal $610_2$ so as to replace residual signal $610_2$ by the new residual signal $610_2'$. The latter is then used instead of residual signal $610_2$ so as to correct the respective prediction signal $120_2/220_2$.

Likewise, if flag $614_3$ indicates the usage of inter-component prediction for a respective residual/transform block, then the inter-component prediction parameter $616_3$ indicates the weight $a_3$ at which the residual signal $610_1$ is added to the residual signal $610_3$ so as to replace the latter and result in the new residual signal $610_3'$, which is then used in order to correct the prediction signal $120_3/220_3$ of the third component.

Instead of separately transmitting a first flag $614_{1/2}$ conditionally followed by an inter-component prediction parameter $616_{2/3}$, another signaling may also be feasible. For example, as the weight $a_{2/3}$ may be a signed value, the domain of possible values of which is symmetrically arranged around zero, the absolute value of $a_{2/3}$ may be used so as to distinguish between the case of not using inter-component prediction as far as component 2/3 is concerned, and using inter-component prediction for the respective component 2/3. In particular, if the absolute value is zero, this corresponds to not using inter-component prediction. The signaling of any sign flag for the respective parameter $a_{2/3}$ may then be suppressed in the data stream 104. As a reminder, in accordance with the embodiment of FIG. 10, the inter-component prediction is varied on a per residual/transform block basis as far as components 2/3 are concerned, the variation including not using inter-component prediction at all, $a_{2/3}=0$, and using inter-component prediction with varying $a_{2/3}$ ($a_{2/3}\neq 0$).

According to a specific syntax example, the inter-component prediction flag 612 may be signaled within a picture parameter set of the data stream 104. The syntax element may be denoted as cross_component_prediction_enabled_flag It is noted, however, that the scope of flag 612 may be chosen differently. For example, flag 612 may relate to smaller units, such as slices of picture 102/202 or greater units such as groups of pictures or a sequence of pictures.

Per residual/transform block, syntax elements 614₂, 616₂, 614₃ and 616₃ may be signaled conditionally as just described using the following syntax with parameter c indicating the component and, accordingly, assuming one value for component 2 and the other value for component 3, and parameters x0 and y0 denoting, for example, the respective residual/transform block by way of, for example the position of its upper left corner sample.

```
cross_comp_pred( x0, y0, c ) {
    log2_res_scale_abs_plus1[ c ]
    if( log2_res_scale_abs_plus1[ c ] != 0 )
        res_scale_sign _flag[ c ]}
```

That is, the above syntax would occur in the data stream 104, for example, for each residual or transform block of the picture twice, one for each of the second and third components, such as the chroma components whereas the luma component would form the base (first) component.

As previously indicated with respect to FIG. 10, the just outlined syntax example corresponds to the alternative to the configuration of FIG. 10: log 2_res_scale_abs_plus1 signals the absolute value of a and if the syntax element is zero, this corresponds to the inter-component prediction not being used for the respective component c. If used, however, res_scale_sign_flag is signaled and indicates the sign of a.

The semantics of the syntax elements presented so far could be provided as follows:

cross_component_prediction_enabled_flag equal to 1 specifies that log 2_res_scale_abs_plus1 and res_scale_sign_flag may be present in the transform unit syntax for pictures referring to the PPS. cross_component_prediction_enabled_flag equal to 0 specifies that log 2_res_scale_abs_plus1 and res_scale_sign_flag are not present for pictures referring to the PPS. When not present, the value of cross_component_prediction_enabled_flag is inferred to be equal to 0. When ChromaArrayType is not equal to 3, it is a requirement of bitstream conformance that the value of cross_component_prediction_enabled_flag shall be equal to 0.

log 2_res_scale_abs_plus1[c] minus 1 specifies the base 2 logarithm of the magnitude of the scaling factor ResScale Val used in cross-component residual prediction. When not present, log 2_res_scale_abs_plus1 is inferred equal to 0.

res_scale_sign_flag[c] specifies the sign of the scaling factor used in cross-component residual prediction as follows:

If res_scale_sign_flag[c] is equal to 0, the corresponding ResScaleVal has a positive value.

Otherwise (res_scale_sign_flag[c] is equal to 1), the corresponding ResScaleVal has a negative value.

The variable ResScaleVal[cIdx][x0][y0] specifies the scaling factor used in cross-component residual prediction. The array indices x0, y0 specify the location (x0, y0) of the top-left luma sample of the considered transform block relative to the top-left luma sample of the picture. The array index cIdx specifies an indicator for the color component; it is equal to 1 for $C_b$, and equal to 2 for $C_r$.

The variable ResScaleVal[cIdx] [x0] [y0] is derived as follows:

If log 2_res_scale_abs_plus1[cIdx−1] is equal to 0, the following applies: ResScaleVal[cIdx] [x0] [y0]=0

Otherwise (log 2_res_scale_abs_plus1[cIdx−1] is not equal to 0), the following applies: ResScaleVal[cIdx] [x0][y0]=(1<< (log 2_res_scale_abs_plus1[cIdx−1]−1))*(1-2*res_scale_sign_flag[cIdx−1])

In the above, ResScale Val corresponds to the aforementioned a.

That is, the sample values within a residual/transform block 604, for which inter-component prediction is used, i.e., for which log 2_res_scale_abs_plus1≈0, at positions x, y, i.e., r[x][y], are computed on the basis of the co-located residual sample values rγ[x][y] of the first component according to, for example, $$r[\,x\,][\,y\,] \mapsto ( \text{ResScale Val}[\,\text{cIdx}\,][\,xTbY\,][\,yTbY\,] * \\ ( ( r\gamma[\,x\,][\,y\,] << \text{BitDepth}_c ) >> \text{BitDepth}_\gamma ) ) >> 3$$

wherein $\text{BitDepth}_c$ is the bit depth of the dependent components 2/3 and $\text{BitDepth}_\gamma$ is the bit depth of the first component.

The right shift ">>3" corresponds to a division by eight. According to the present example, the signalizable a values are, as already exemplified above, {0, ±0.125, ±0.25, ±0.5, ±1}.

log 2_res_scale_abs_plus1 may be signaled in the data stream using a truncated unary binarization and binary arithmetic coding and binary arithmetic decoding and truncated unary debinarization, respectively. The binary arithmetic de/coding may be context-adaptively. The context may be selected based on the local neighbourhood. For example, per bin of the binarization of log 2_res_scale_abs_plus1, a different context may be chosen. Different sets of contexts may be used for both chroma components. Likewise, res_scale_sign_flag may be signaled in the data stream binary arithmetic coding and binary arithmetic decoding, respectively. The binary arithmetic de/coding may be context-adaptively. And different context may be used for both chroma components. Alternatively, the same contexts would be used for both chroma components.

As described, the mapping from log 2_res_scale_abs_plus1 to the absolute value of a, i.e. ResScaleVal>>3, may be done arithmetically using a bit shift operation, i.e., by an exponential function.

The signaling of log 2_res_scale_abs_plus1 and res_scale_sign_flag for the two chroma components may be skipped for a certain residual/transform block if the luma component within the latter is zero. As log 2_res_scale- _abs_plus1 and res_scale_sign_flag are examples for signaling 614 and 616 in FIG. 10, this means that the decoder may possibly check whether, for a currently decoded portion of the second component 208, the spatially corresponding portion 442 of the reconstructed first component signal $256_1$ is zero and, depending on the check, either explicitly read the sub-picture level syntax elements $614_2$, $616_2$, $614_3$, $616_3$ from the data stream and perform the reconstruction of the component signals $256'_{2,3}$ from the spatially corresponding portion 442, or skip the explicit reading and, optionally, not performing the reconstruction of the second component signal $256'_{2,3}$ from the spatially corresponding portion 442, but leaving the second component signal $256_{2,3}$ as it is, instead.

Thus, FIG. 10 exemplifies a decoder configured to decode a multi-component picture 202 spatially sampling a scene with respect to different components 206, 208, 210, by reconstructing a first component signal $610_1$ relating to a first component 206 from the data stream 104; and reconstructing a portion 440 of the second component signal $610'_{2,3}$, relating to a second (third) component 208/210 of the multi-component picture 202 from a spatially corresponding portion 442 of the reconstructed first component signal $610_1$ and a correction signal $610_{2,3}$ derived from the data stream. The first component signal $610_1$ is a prediction residual of a temporally, spatially or inter-view prediction of the first component 206 of the multi-component picture 202, and the decoder may perform the temporal, spatial or inter-view prediction of the first component 206 of the multi-component picture 202 and reconstruct the first component 206 of the multi-component picture by correcting the temporal, spatial or inter-view prediction of the first component using the reconstructed first component signal $610_1$. The decoder is configured to, at the sub-picture granularity, adaptively set, depending on signaling in the data stream, the first weight $a_{2,3}$. To this end, the decoder is configured to, at the sub-picture granularity, read a first weight's absolute value from the data stream and, in a manner conditionally depending on whether same is zero, a first weight's sign. The decoder is configured to, at the sub-picture granularity, skip reading the first weight's absolute value from the data stream and, in a manner conditionally depending on whether same is zero, the first weight's sign at portions where the first component signal is zero. In reconstructing the second component signal, the decoder adds the spatially corresponding portion of the reconstructed first component signal, weighted by the first weight ($a_2$), to the correction signal. The addition may be done in the spatial domain in a sample-wise manner. Alternatively, it's done in the spectral domain. The encoder performs the same in the prediction loop.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

Thus, above description, inter alia described the following embodiments:

According to a first embodiment, a decoder is configured to decode a multi-component picture 202 spatially sampling a scene with respect to different components 206, 208, 210, by reconstructing a first component signal $256_1$; $270_1$ relating to a first component 206 of the multi-component picture 202 from a data stream 104; reconstructing 400 a portion 440 of a second component signal $256'_2$; $207'_2$ relating to a second component 208 of the multi-component picture 202 from a spatially corresponding portion of the reconstructed first component signal $256_1$; $270_1$ and a correction signal $256_2$; $270_2$ derived from the data stream.

According to a second embodiment, the decoder according to the first embodiment is configured as a block-based hybrid video decoder configured to sub-divide the multi-component picture 202 regularly into tree blocks 302, sub-divide the tree blocks using recursive multi-tree subdivisioning into code blocks 304 individually and subdivide each code block using recursive multi-tree subdivisioning into prediction blocks 308 and using recursive multi-tree subdivisioning into residual blocks 312 individually, and subdivide the residual blocks into transform blocks 316; select prediction modes depending on the data stream at a granularity depending on the code blocks or depending on the prediction blocks; set prediction parameters depending on the data stream at a granularity of the prediction blocks; derive a prediction signal $220_1$, $220_2$, $220_3$ using the prediction modes and prediction parameters; derive a residual signal $256_1$, $256'_2$, $256'_3$ within each residual block by performing inverse transformations within the transform blocks individually, and reconstruct the multi-component picture 202 by correcting the prediction signal using the residual signal, the decoder being responsive to a signaling $614_2$; $614_3$ in the data stream so as to, at a granularity of the residual blocks and/or transform blocks, switch between performing the reconstructing of the second component signal from the spatially corresponding portion of the reconstructed first component signal and the correction signal and a reconstructing the second component signal from the correction signal irrespective the spatially corresponding portion of the reconstructed first component signal.

According to a third embodiment, the decoder according to the first embodiment is configured such that the first component signal is a prediction residual of a temporally, spatially or inter-view prediction of the first component 206 of the multi-component picture 202, and to perform the temporal, spatial or inter-view prediction of the first component 206 of the multi-component picture 202 and reconstruct the first component 206 of the multi-component picture by correcting the temporal, spatial or inter-view prediction of the first component using the reconstructed first component signal.

According to a fourth embodiment, the decoder according to the first embodiment is configured such that the second component signal is a prediction residual of a temporal, spatial or inter-view prediction of the second component 208 of the multi-component picture 202, and to perform the temporal, spatial or inter-view prediction of the second component 208 of the multi-component picture and reconstruct the second component 208 of the multi-component picture 202 by correcting the temporal, spatial or inter-view prediction of the multi-component picture 202 using the reconstructed second component signal.

According to a fifth embodiment, the decoder according to the first embodiment is configured to obtain the correction signal $256_2$ by performing an inverse spectral transformation $226_2$ onto spectral coefficients relating to the second component 208 derived from the data stream 104 so as to obtain the correction signal in the spatial domain.

According to a sixth embodiment, the decoder according to the first embodiment is configured to, in reconstructing the second component signal, adaptively set a first weight $a_2$ at which the spatially corresponding portion 442 of the reconstructed first component signal influences the reconstruction of the second component signal at a sub-picture granularity.

According to a seventh embodiment, the decoder according to the sixth embodiment is configured to, at the sub-picture granularity, adaptively set, depending on signaling in the data stream, the first weight $a_2$.

According to an eighth embodiment, the decoder according to the sixth embodiment is configured to, at the sub-picture granularity, read a first weight's absolute value from the data stream and, in a manner conditionally depending on whether same is zero, a first weight's sign.

According to a ninth embodiment, the decoder according to the eighth embodiment is configured to, at the sub-picture granularity, skip reading the first weight's absolute value from the data stream and, in a manner conditionally depending on whether same is zero, the first weight's sign at portions where the first component signal is zero.

According to a tenth embodiment, the decoder according to the sixth embodiment is configured to, in reconstructing the second component signal, add the spatially corresponding portion 442 of the reconstructed first component signal, weighted by the first weight $a_2$, to the correction signal.

According to an eleventh embodiment, the decoder according to the tenth embodiment is configured to, in reconstructing the second component signal, perform the addition in the spatial domain in a sample-wise manner.

According to a twelfth embodiment, the decoder according to the sixth embodiment is configured to set the first weight by deriving a high-level syntax element structure 510 from the data stream, having at least picture scope; constructing, at the at least picture scope, a mapping 522 from a domain set of possible bin strings 518 of a predetermined binarization onto a co-domain 520 of possible values of the first weight; and deriving the first weight by reading, at sub-picture granularity, a first-weight syntax element 514 from the data stream using the predetermined binarization and subjecting the first-weight syntax element's bin string to the mapping.

According to a thirteenth embodiment, the decoder according to the twelfth embodiment is configured to derive from the high-level syntax element structure lower and upper bounds 524 of an interval of co-domain values out of a predetermined set of possible non-zero values of the first weight, and, in deriving the first weight, additionally read, at sub-picture granularity, a zero flag 526 from the data stream indicating whether the first weight shall be zero or not with performing the reading of the first-weight syntax element and the subjecting conditionally depending on the zero flag.

According to a fourteenth embodiment, the decoder according to the twelfth embodiment is configured to, in constructing the mapping, derive from the high-level syntax element structure sign and absolute value of a lower bound integer value and sign and absolute value of a upper bound integer value and apply an integer-domain exponential function onto the absolute values of lower bound integer value and upper bound integer value and grab-out, out of a co-domain of the integer-domain exponential function exclusive zero, the co-domain of possible values of the first weight.

According to a fifteenth embodiment, the decoder according to the twelfth embodiment is configured to use a truncated unary binarization as the predetermined binarization for an absolute value part of the first-weight syntax element and, in deriving the first weight, read a sign part 530 of the first-weight syntax element from the data stream before the absolute part 530 of the first-weight syntax element and set a length of the truncated unary binarization of the absolute part of the first-weight syntax element depending on the sign part and the co-domain of possible values of the first weight.

According to a sixteenth embodiment, the decoder according to the twelfth embodiment is configured to derive from the high-level syntax element structure first and second interval bounds 524 and the decoder is configured to use a truncated unary binarization of TU bin strings as the predetermined binarization for an absolute value part of the first-weight syntax element and, in constructing the mapping, reverse an order the possible values onto which the TU bin strings are mapped traverse the co-domain of possible values depending on a comparison of the first and second interval bounds.

According to a seventeenth embodiment, the decoder according to the first embodiment is configured to, in reconstructing the second component signal 208, adaptively set a second weight at which the correction signal influences the reconstruction of the second component signal at a sub-picture granularity.

According to an eighteenth embodiment, the decoder according to the first embodiment is configured to, in reconstructing the second component signal, adaptively set weights of a weighted sum of the correction signal and the spatially corresponding portion 442 of the reconstructed first component signal at a sub-picture granularity and use the weighted sum as a scalar argument of a scalar function which is, at least per picture, constant so as to obtain the reconstructed second component signal.

According to a nineteenth embodiment, the decoder according to the first embodiment is configured to, in reconstructing the second component signal, adaptively set weights of a weighted sum of the correction signal, the spatially corresponding portion 442 of the reconstructed first component signal and a constant at a sub-picture granularity and use the weighted sum as a scalar argument of a scalar function which is, at least per picture, constant so as to obtain the reconstructed second component signal.

According to a twentieth embodiment, the decoder according to the eighteenth embodiment is configured to set the weights in a backward-driven manner based on a local neighbourhood.

According to a twenty-first embodiment, the decoder according to the eighteenth embodiment is configured to set the weights in a backward-driven manner based on a local neighbourhood, with correcting the weights in a forward-driven manner.

According to a twenty-second embodiment, the decoder according to the twentieth embodiment is configured to set the weights in a backward-driven manner based on attributes of an already decoded portion of the multi-component picture.

According to a twenty-third embodiment, the decoder according to the eighteenth embodiment is configured to set the weights, in a combined backward and forward adaptive manner, or a forward-adaptive manner, a backward-adaptive manner, to default values, at a first spatial granularity, and refine the weights in a backward-driven manner based on a local neighbourhood at a second spatial granularity being finer than the first spatial granularity.

According to a twenty-fourth embodiment, the decoder according to the sixteenth embodiment is configured to set the weights to one of m different states depending on many sub-picture level syntax elements wherein the decoder is configured to derive m from a higher-level syntax element 510.

According to a twenty-fifth embodiment, the decoder according to the first embodiment is configured to adaptively switch, at a sub-picture granularity, in reconstructing the second component signal, between performing an inverse spectral transformation onto spectral coefficients relating to the second component 208 derived from the data stream so as to obtain the correction signal x in a spatial domain and reconstructing 400 the second component signal z using the correction signal x in the spatial domain, and obtaining the correction signal x in a spectral domain from the data stream, reconstructing 400, in the spectral domain, the second component signal z using the correction signal x as obtained in the spectral domain, and subjecting the, in the spectral domain, reconstructed second component signal z to an inverse spectral transformation.

According to a twenty-sixth embodiment, the decoder according to the twenty-fifth embodiment is configured to perform the adaptively switching in a backward-adaptive manner and/or forward-adaptive manner 490.

According to a twenty-seventh embodiment, the decoder according to the first embodiment is configured to adaptively switch, at a sub-picture granularity, a direction of reconstruction of the second component signal between performing the reconstruction of the second component signal from the spatially corresponding portion of the reconstructed first component signal and reversing the reconstruction so as to reconstruct of the first component signal from a spatially corresponding portion of the reconstructed second component signal.

According to a twenty-eighth embodiment, the decoder according to the first embodiment is configured to adaptively switch, responsive to a syntax element 472 signaling an order among the first and second component signals, a direction of reconstruction of the second component signal between performing the reconstruction of the second component signal from the spatially corresponding portion of the reconstructed first component signal and reversing the reconstruction so as to reconstruct of the first component signal from a spatially corresponding portion of the reconstructed second component signal.

According to a twenty-ninth embodiment, the decoder according to the first embodiment is configured to adaptively switch, at a sub-picture granularity, the reconstruction of the second component signal between reconstructing same merely based on the reconstructed first component signal and reconstructing same based on the reconstructed first component signal and a third reconstructed component signal.

According to a thirtieth embodiment, in the decoder according to the first embodiment, the first and second components are color components.

According to a thirty-first embodiment, in the decoder according to the first embodiment, the first component is luma and the second component is a chroma component.

According to a thirty-second embodiment, in the decoder according to the first embodiment, the decoder is responsive to a first syntax element 612 in the data stream so as to, depending on the first syntax element 612, enable the reconstruction of the second component signal based on the reconstructed first component signal, read sub-picture level syntax elements 614$_2$, 616$_2$, 614$_3$, 616$_3$ from the data stream in parsing the data stream and adapt the reconstruction of the second component signal based on the reconstructed first component signal at a sub-picture granularity based on the sub-picture level syntax elements, and disable the reconstruction of the second component signal based on the reconstructed first component signal, and change the parsing the data stream to address the data stream not comprising the sub-picture level syntax elements.

According to a thirty-third embodiment, in the decoder according to the first embodiment, the decoder is configured to, in a backward-driven manner, switch locally between enabling the reconstruction of the second component signal based on the reconstructed first component signal, and disabling the reconstruction of the second component signal based on the reconstructed first component signal.

According to a thirty-fourth embodiment, in the decoder according to the thirty-third embodiment, the decoder is configured to perform the local switching in a backward-driven manner.

According to a thirty-fifth embodiment, in the decoder according to the thirty-third embodiment, the decoder is configured such that the first component signal is a prediction residual of a temporally, spatially or inter-view prediction of the first component of the multi-component picture, and to perform the temporal, spatial or inter-view prediction of the first component of the multi-component picture and reconstruct the first component of the multi-component picture by correcting the temporal, spatial or inter-view prediction of the first component using the reconstructed first component signal, the decoder is configured such that the second component signal is a prediction residual of a temporal, spatial or inter-view prediction of the second component of the multi-component picture, and to perform the temporal, spatial or inter-view prediction of the second component of the multi-component picture and reconstruct the second component of the multi-component picture by correcting the temporal, spatial or inter-view prediction of the multi-component picture using the reconstructed second component signal, and the decoder is configured to perform the local switching by locally checking whether the first and the second component signals are prediction residuals of a spatial prediction and whether an intra-prediction mode of the spatial prediction coincides, or by locally checking whether the first and the second component signals are prediction residuals of a spatial prediction and whether an intra-prediction mode of the spatial prediction does not deviate by more than a predetermined amount.

According to a thirty-sixth embodiment, in the decoder according to the thirty-third embodiment, the decoder is configured to decide on the local switching firstly in a backward-driven manner with modifying the decision in a forward-adaptive manner responsive to a signaling in the data stream.

According to a thirty-seventh embodiment, in the decoder according to the first embodiment, the decoder is responsive to a second syntax element in the data stream so as to, depending on the second syntax element, read sub-picture level syntax elements from the data stream in parsing the data stream and adapt the reconstruction of the second component signal based on the reconstructed first component signal at a sub-picture granularity based on the sub-picture level syntax elements, and perform the reconstruction of the second component signal based on the reconstructed first component signal non-adaptively.

According to a thirty-eighth embodiment, in the decoder according to the first embodiment, the first and second components 206, 208 are two of three color components, and the decoder is configured to also reconstruct a third component signal relating to the third color component 210 of the multi-component picture 202 from a spatially corresponding portion of the reconstructed first or second component signal and a correction signal derived from the data stream for the third component, wherein the decoder is configured to perform the reconstruction of the second and third component signals on a sub-picture level adaptively individually.

According to a thirty-ninth embodiment, in the decoder according to the first embodiment, the first component 206 is luma, the second component 208 is a first chroma component and the third component 210 is a second chroma component and the decoder is configured to entropy decode first sub-picture level syntax elements 614$_2$, 616$_2$ for adapting the reconstruction of the second component signal relating to the first color component of the multi-component picture and second sub-picture level syntax elements 614$_3$, 616$_3$ for adapting the reconstruction of the third component signal relating to the first color component of the multi-component picture from the spatially corresponding portion of the reconstructed first or second component signal context-adaptively using the same contexts.

According to a fortieth embodiment, in the decoder according to the first embodiment, the first component is luma, the second component is a first chroma component and the third component is a second chroma component and the decoder is configured to entropy decode first sub-picture level syntax elements for adapting the reconstruction of the second component signal relating to the first color component of the multi-component picture and second sub-picture level syntax elements for adapting the reconstruction of the third component signal relating to the first color component of the multi-component picture from the spatially corresponding portion of the reconstructed first or second component signal context-adaptively using separate contexts.

According to a forty-first embodiment, in the decoder according to the first embodiment, the decoder is configured to read sub-picture level syntax elements from the data stream in parsing the data stream and adapt the reconstruction of the second component signal based on the reconstructed first component signal at a sub-picture granularity based on the sub-picture level syntax elements, and, in parsing the data stream, check as to whether, for a currently decoded portion of the second component, the spatially corresponding portion 442 of the reconstructed first component signal is zero and, depending on the check, explicitly read the sub-picture level syntax elements from the data stream and perform the reconstruction of the second component signal from the spatially corresponding portion of the reconstructed first component signal, or skip the explicit reading.

According to a forty-first embodiment, in the decoder according to the first embodiment, the decoder is configured to entropy decode the sub-picture level syntax elements from the data stream using a Golomb Rice Code.

According to a forty-first embodiment, in the decoder according to the forty-second embodiment, the decoder is configured to, in entropy decoding the sub-picture level syntax elements from the data stream, binary arithmetic decode bins of the Golomb Rice Code.

According to a forty-first embodiment, in the decoder according to the forty-third embodiment, the decoder is configured to, in entropy decoding the sub-picture level syntax elements from the data stream, binary arithmetic decode bins of the Golomb Rice Code at different bin positions using different contexts.

According to a forty-first embodiment, in the decoder according to the forty-third embodiment, the decoder is configured to, in entropy decoding the sub-picture level syntax elements from the data stream, binary arithmetic decode bins of the Golomb Rice Code at bin positions exceeding a predetermined value, context-less.

According to a forty-first embodiment, in the decoder according to the first embodiment, the decoder is configured to, in reconstructing the second component signal, spatially re-scale, and/or perform a bit-depth precision mapping on, the spatially corresponding portion of the reconstructed first component signal.

According to a forty-first embodiment, in the decoder according to the forty-sixth embodiment, the decoder is configured to adapt the spatially re-scaling, and/or performance of the bit-depth precision mapping, in a backward- and/or forward-adaptive manner.

According to a forty-first embodiment, in the decoder according to the forty-sixth embodiment, the decoder is configured to adapt the spatially re-scaling by selecting a spatial filter, in a backward- and/or forward-adaptive manner.

According to a forty-first embodiment, in the decoder according to the forty-eighth embodiment, the decoder is configured to adapt the performance of the bit-depth precision mapping, by selecting a mapping function, in a backward- and/or forward-adaptive manner.

According to a fiftieth embodiment, in the decoder according to the first embodiment, the decoder is configured to, in reconstructing the second component signal, reconstruct the second component signal from a spatially low-pass filtered version of the reconstructed first component signal.

According to a fifty-first embodiment, in the decoder according to the fiftieth embodiment, the decoder is configured to perform the reconstruction of the second component signal from the spatially low-pass filtered version of the reconstructed first component signal in a forward adaptive manner or in a backward-adaptive manner.

According to a fifty-second embodiment, in the decoder according to the fiftieth embodiment, the decoder is configured to adapt the reconstruction of the second component signal from the spatially low-pass filtered version of the reconstructed first component signal by setting a low-pass filter used for the low-pass filtering in a forward adaptive manner or in a backward-adaptive manner.

According to a fifty-third embodiment, in the decoder according to the forty-fifth embodiment, the decoder is configured to perform the spatial low-pass filtering leading to the low-pass filtered version of the reconstructed first component signal using binning.

According to a fifty-fourth embodiment, an encoder is configured to encode a multi-component picture 202 spatially sampling a scene with respect to different components 206, 208, 210, by encoding 400 a portion 440 of a second component signal $256'_2$; $270'_2$ relating to a second component 208 of the multi-component picture 202 by inter-component prediction on the basis of a spatially corresponding portion of a reconstructed first component signal $256_1$; $270_1$ and inserting a correction signal $256_2$; $270_2$ for correcting the inter-component prediction into the data stream.

According to a fifty-fifth embodiment, a method for decoding a multi-component picture 202 spatially sampling a scene with respect to different components 206, 208, 210 comprises reconstructing a first component signal $256_1$; $270_1$ relating to a first component 206 of the multi-component picture 202 from a data stream 104; and reconstructing 400 a portion 440 of a second component signal $256'_2$; $270'_2$ relating to a second component 208 of the multi-component picture 202 from a spatially corresponding portion of the reconstructed first component signal $256_1$; $270_1$ and a correction signal $256_2$; $270_2$ derived from the data stream.

According to a fifty-sixth embodiment, a method for encoding a multi-component picture 202 spatially sampling a scene with respect to different components 206, 208, 210 comprises encoding 400 a portion 440 of a second component signal $256'_2$; $270'_2$ relating to a second component 208 of the multi-component picture 202 by inter-component prediction on the basis of a spatially corresponding portion of a reconstructed first component signal $256_1$; $270_1$ and inserting a correction signal $256_2$; $270_2$ for correcting the inter-component prediction into the data stream.

According to a fifty-seventh embodiment, a computer program has a program code for performing, when running on a computer, a method according to the fifty-fifth or fifty-sixth embodiment.

The invention claimed is:

1. A decoder configured to decode a multi-component picture, the decoder comprising a processor configured for:
   determining, based on information extracted from an encoded data stream, a first residual signal relating to a first component of the multi-component picture;
   extracting, from the encoded data stream, a first signaling syntax element that indicates whether or not an inter-component prediction is enabled for the multicomponent picture;
   extracting, from the encoded data stream, a second signaling syntax element that indicates a scaling factor based on which the first residual signal is to be added to a second residual signal of a second component of the multi-component picture to generate a new residual signal for replacing the second residual signal;
   extracting, from the encoded data stream, a third signaling syntax element associated with the second signaling syntax element;
   deriving a portion of the second residual signal based on a portion of the first residual signal scaled using the scaling factor and the third signaling syntax element; and
   reconstructing the multi-component picture based on the first residual signal and the second residual signal.

2. The decoder according to claim 1, wherein the scaling factor is decoded based on truncated unary binarization and context-adaptive binary arithmetic coding.

3. The decoder according to claim 1, wherein the third signaling syntax element indicates a sign value of the scaling factor when the scaling factor is not equal to zero.

4. The decoder according to claim 3, wherein the sign value is decoded based on context-adaptive binary arithmetic coding.

5. The decoder according to claim 1, wherein the portion of the second residual signal is derived based on scaling the portion of the first residual signal using the scaling factor, a bit depth value of the first component, and a bit depth value of the second component.

6. The decoder according to claim 1, wherein the processor is further configured for:

extracting, from the encoded data stream, a fourth signaling syntax element that indicates a second scaling factor based on which the first residual signal is to be added to a third residual signal of a third component of the multi-component picture to generate a new residual signal for replacing the third residual signal;

extracting, from the encoded data stream, a fifth signaling syntax element associated with the fourth signaling syntax element;

deriving a portion of the third residual signal based on a portion of the first residual signal scaled using the second scaling factor and the fifth signaling syntax element; and reconstructing the multi-component picture based on the first residual signal, the second residual signal and the third residual signal.

7. The decoder according to claim 6, wherein the first, second and third components are three color components of the multi-component picture.

8. The decoder according to claim 1, wherein the processor is configured for:

sub-dividing the multi-component picture into prediction blocks and residual blocks;

sub-dividing the residual blocks into transform blocks;

selecting prediction modes based on first information from the encoded data stream;

determining prediction parameters for the prediction blocks based on second information from the encoded data stream;

deriving a prediction signal using the prediction modes and the prediction parameters;

deriving a residual signal within each residual block by performing inverse transformations within the transform blocks; and reconstructing the multi-component picture by combining the prediction signal and the residual signal.

9. A method for decoding a multi-component picture, comprising:

determining, based on information extracted from an encoded data stream, a first residual signal relating to a first component of the multi-component picture;

extracting, from the encoded data stream, a first signaling syntax element that indicates whether or not an inter-component prediction is enabled for the multicomponent picture;

extracting, from the encoded data stream, a second signaling syntax element that indicates a scaling factor based on which the first residual signal is to be added to a second residual signal of a second component of the multi-component picture to generate a new residual signal for replacing the second residual signal;

extracting, from the encoded data stream, a third signaling syntax element associated with the second signaling syntax element;

deriving a portion of the second residual signal based on a portion of the first residual signal scaled using the scaling factor and the third signaling syntax element; and reconstructing the multi-component picture based on the first residual signal and the second residual signal.

10. The method according to claim 9, wherein:

the scaling factor is decoded based on truncated unary binarization and context-adaptive binary arithmetic coding.

11. The method according to claim 9, wherein:

the third signaling syntax element indicates a sign value of the scaling factor when the scaling factor is not equal to zero.

12. The method according to claim 11, wherein:

the sign value is decoded based on context-adaptive binary arithmetic coding.

13. The method according to claim 9, wherein the portion of the second residual signal is derived based on scaling the portion of the first residual signal using the scaling factor, a bit depth value of the first component, and a bit depth value of the second component.

14. The method according to claim 9, further comprising:

extracting, from the encoded data stream, a fourth signaling syntax element that indicates a second scaling factor based on which the first residual signal is to be added to a third residual signal of a third component of the multi-component picture to generate a new residual signal for replacing the third residual signal;

extracting, from the encoded data stream, a fifth signaling syntax element associated with the fourth signaling syntax element;

deriving a portion of the third residual signal based on a portion of the first residual signal scaled using the second scaling factor and the fifth signaling syntax element; and reconstructing the multi-component picture based on the first residual signal, the second residual signal and the third residual signal.

15. The method according to claim 14, wherein the first, second and third components are three color components of the multi-component picture.

16. The method according to claim 9, further comprising:

sub-dividing the multi-component picture into prediction blocks and residual blocks;

sub-dividing the residual blocks into transform blocks;

selecting prediction modes based on first information from the encoded data stream;

determining prediction parameters for the prediction blocks based on second information from the encoded data stream;

deriving a prediction signal using the prediction modes and the prediction parameters;

deriving a residual signal within each residual block by performing inverse transformations within the transform blocks; and reconstructing the multi-component picture by combining the prediction signal and the residual signal.

17. A method for encoding a multi-component picture, comprising:

obtaining a first residual signal relating to a first component of the multicomponent picture;

encoding, into a data stream, the first residual signal;

encoding, into the data stream, a first signaling syntax element that indicates whether or not an inter-component prediction is enabled for the multi-component picture;

encoding, into the data stream, a second signaling syntax element that indicates a scaling factor based on which the first residual signal is to be added to a second residual signal of a second component of the multi-component picture to generate a new residual signal for replacing the second residual signal; and encoding, into the data stream, a third signaling syntax
element associated with the second signaling syntax
element, wherein a portion of the second residual signal
is derived based on a portion of the first residual signal
scaled using the scaling factor and the third signaling 5
syntax element.

18. The method according to claim 17, wherein:
the scaling factor is encoded based on truncated unary
binarization and context-adaptive binary arithmetic
coding. 10

19. The method according to claim 17, wherein:
the third signaling syntax element indicates a sign value
of the scaling factor when the scaling factor is not equal
to zero.

20. The method according to claim 19, wherein: 15
the sign value is encoded based on context-adaptive
binary arithmetic coding.

\* \* \* \* \*